US012409802B2

(12) United States Patent
Jessup et al.

(10) Patent No.: US 12,409,802 B2
(45) Date of Patent: Sep. 9, 2025

(54) COMBINATION INFLATABLE AND WEB-BASED RESTRAINT FOR A MOTOR VEHICLE SEAT

(71) Applicant: INDIANA MILLS & MANUFACTURING, INC., Westfield, IN (US)

(72) Inventors: Chris P. Jessup, Sheridan, IN (US); Douglas W. Bittner, Indianapolis, IN (US); Steven Gale, Colfax, IN (US)

(73) Assignee: INDIANA MILLS & MANUFACTURING, INC., Westfield, IN (US)

( * ) Notice: Subject to any disclaimer, the term of this patent is extended or adjusted under 35 U.S.C. 154(b) by 0 days.

(21) Appl. No.: 18/578,392

(22) PCT Filed: Aug. 2, 2022

(86) PCT No.: PCT/US2022/039130
§ 371 (c)(1),
(2) Date: Jan. 11, 2024

(87) PCT Pub. No.: WO2023/014688
PCT Pub. Date: Feb. 9, 2023

(65) Prior Publication Data
US 2024/0294135 A1 Sep. 5, 2024

Related U.S. Application Data

(60) Provisional application No. 63/229,078, filed on Aug. 4, 2021.

(51) Int. Cl.
*B60R 21/18* (2006.01)
*B60R 21/2165* (2011.01)
(Continued)

(52) U.S. Cl.
CPC .......... *B60R 21/18* (2013.01); *B60R 21/2165* (2013.01); *B60R 21/261* (2013.01); *B60R 22/00* (2013.01); *B60R 2021/2612* (2013.01)

(58) Field of Classification Search
CPC ... B60R 21/18; B60R 21/2165; B60R 21/261; B60R 22/00; B60R 2021/2612
See application file for complete search history.

(56) References Cited

U.S. PATENT DOCUMENTS 5,330,255 A 7/1994 Stawicki
6,237,945 B1 * 5/2001 Aboud .................... B60R 21/18
280/808

(Continued)

OTHER PUBLICATIONS

PCT International Search Report and Written Opinion completed by the ISA/US on Oct. 6, 2022 and issued in connection with PCT/US2022/039130.

(Continued)

*Primary Examiner* — Jason D Shanske
*Assistant Examiner* — Matthew James O'Neill
(74) *Attorney, Agent, or Firm* — Barnes & Thornburg LLP

(57) ABSTRACT

A combination inflatable and web-based restraint for a motor vehicle seat may include an occupant restraint collar having an arcuate portion with first and second spaced apart legs each joined thereto or integral therewith, the collar configured to extend about a neck and over opposite shoulders of an occupant of the seat, first and second shoulder webs of the restraint each movably coupled to a respective one of the first and second legs such the collar is movable along the first and second shoulder webs, an inflatable airbag housed, in an uninflated state, within the arcuate portion and the first and second legs of the collar, the airbag and configured to open a seam of, and extend out of, the arcuate portion and (Continued)

the first and second legs upon deployment thereof, and at least one inflator fluidly coupled to the airbag for deploying the airbag.

20 Claims, 23 Drawing Sheets

(51) Int. Cl.
*B60R 21/261* (2011.01)
*B60R 22/00* (2006.01)

(56) References Cited

U.S. PATENT DOCUMENTS

| | | | |
|---|---|---|---|
| 7,926,839 B1 * | 4/2011 | Mothaffar | B60R 22/001 |
| | | | 280/733 |
| 8,480,127 B2 | 7/2013 | Rathmann-Ramlow et al. | |
| 8,714,589 B2 | 5/2014 | Santana-Gallego et al. | |
| 8,888,127 B2 | 11/2014 | Santana-Gallego | |
| 9,745,065 B2 * | 8/2017 | Santana-Gallego | B64D 11/06 |
| 10,850,699 B2 | 12/2020 | Dry et al. | |
| 2002/0125701 A1 * | 9/2002 | Devonport | B60R 21/18 |
| | | | 280/733 |
| 2002/0171233 A1 * | 11/2002 | Grace | B60R 21/23138 |
| | | | 280/733 |
| 2008/0246264 A1 | 10/2008 | Gerfast | |
| 2009/0179407 A1 * | 7/2009 | Kalandek | B60R 21/18 |
| | | | 280/733 |
| 2012/0193899 A1 * | 8/2012 | Santana-Gallego | |
| | | | B60R 21/268 |
| | | | 280/736 |
| 2020/0254953 A1 | 8/2020 | Jessup et al. | |

OTHER PUBLICATIONS

Extended European Search Report for application No. EP22853790.8, dated May 16, 2025.

* cited by examiner

COMBINATION INFLATABLE AND WEB-BASED RESTRAINT FOR A MOTOR VEHICLE SEAT

CROSS-REFERENCE TO RELATED APPLICATIONS

This patent application is a U.S. National Stage entry of PCT Application No. PCT/US2022/039130, filed Aug. 2, 2022, which claims the benefit of, and priority to, U.S. Provisional Patent Application Ser. No. 63/229,078, filed Aug. 4, 2021, the disclosures of which are expressly incorporated herein by reference in their entireties.

FIELD OF THE INVENTION

This disclosure relates generally to restraint systems for occupant seats in motor vehicles, and more specifically to such restraint systems including inflatable and web-based restraints.

BACKGROUND

Motor vehicle seat restraint systems typically include a multi-point restraint harness, made up of one or more restraint webs, coupled thereto. Such motor vehicle seat restraint systems are typically incorporated into a motor vehicle seat assembly to be installed in a motor vehicle, with a portion of the restraint system and/or seat assembly being fixedly coupled to the motor vehicle. Some such motor vehicle seat restraint systems may include or incorporate one or more inflatable restraints.

SUMMARY

This disclosure may comprise one or more of the features recited in the attached claims, and/or one or more of the following features and combinations thereof. In one aspect, a combination inflatable and web-based restraint for an occupant of a motor vehicle seat may comprise an occupant restraint collar having an arcuate portion, and first and second spaced apart legs each joined to or integral with the arcuate portion and extending downwardly from the arcuate portion to first and second respective free ends, the arcuate portion configured to extend about a back of a neck and over opposite shoulders of the occupant with the first and second legs extending downwardly along respective sides of a torso of the occupant, a first shoulder web extending through or over a seat back of the vehicle seat, the first shoulder web movably coupled to the first leg adjacent to a front of the seat back such that the collar is movable along the first shoulder web, a second shoulder web extending through or over the seat back and movably coupled to the second leg adjacent to the front of the seat back such the collar is movable along the second shoulder web, an inflatable airbag housed, in an uninflated state, within arcuate portion and the first and second legs of the occupant restraint collar, the airbag and configured to open a seam of, and extend out of, the arcuate portion and the first and second legs of the occupant restraint collar upon deployment thereof, and at least one inflator fluidly coupled to the airbag for deploying the airbag.

In another aspect, an occupant seat for a motor vehicle may comprise a seat bottom configured to be mounted to a motor vehicle, a seat back extending upwardly away from the seat bottom to define an occupant support area between the seat bottom and a front side of the seat back, a restraint harness configured to restrain an occupant seated in the occupant support area, the restraint harness including first and second shoulder webs each extending from the occupant support area through or over the seat back, an occupant restraint collar having an arcuate portion, and first and second spaced apart legs each joined to or integral with the arcuate portion and extending downwardly from the arcuate portion to first and second respective free ends, the arcuate portion configured to extend about a back of a neck and over opposite shoulders of the occupant in the occupant support area with the first and second legs extending downwardly along respective sides of a torso of the occupant, the first shoulder web movably coupled to the first leg and the second shoulder web movably coupled to the second leg, an inflatable airbag housed, in an uninflated state, within arcuate portion and the first and second legs of the occupant restraint collar, the airbag and configured to open a seam of, and extend out of, the arcuate portion and the first and second legs of the occupant restraint collar upon deployment thereof, and at least one inflator fluidly coupled to the airbag for deploying the airbag.

In yet another aspect, a combination inflatable and web-based restraint for an occupant of a motor vehicle seat may comprise a U-shaped occupant restraint collar configured to extend about a back of a neck and over opposite shoulders of the occupant, a first shoulder web extending through or over a seat back of the vehicle seat, the first shoulder web movably coupled to the collar adjacent to a front of the seat back such that the collar is movable along the first shoulder web, a second shoulder web extending through or over the seat back and movably coupled to the collar adjacent to the front of the seat back such the collar is movable along the second shoulder web, the collar also movable relative to the seat back, an inflatable airbag housed, in an uninflated state, within the collar, the airbag and configured to open a seam of, and extend out of, the collar upon deployment thereof, at least one filler tube configured to extend through, and move relative to, the seat back of the vehicle seat, the at least one filler tube having at least one end fluidly coupled to the airbag within the collar and at least an opposite end disposed along a back side of the seat back, and at least one inflator having at least one gas outlet fluidly coupled to the at least an opposite end of the at least one filler tube, the at least one inflator configured to inflate and deploy the airbag.

In a further aspect, an occupant seat for a motor vehicle may comprise a seat bottom configured to be mounted to a motor vehicle, a seat back extending upwardly away from the seat bottom to define an occupant support area between the seat bottom and a front side of the seat back, a restraint harness configured to restrain an occupant seated in the occupant support area, the restraint harness including first and second shoulder webs each extending from the occupant support area through or over the seat back, a U-shaped occupant restraint collar configured to extend about a back of a neck and over opposite shoulders of the occupant, the collar movably coupled to the first and second shoulder webs, and the collar movable relative to the seat back, an inflatable airbag housed, in an uninflated state, within the collar, the airbag and configured to open a seam of, and extend out of, the collar upon deployment thereof, at least one filler tube extending through, and movable relative to, the seat back of the vehicle seat, the at least one filler tube having at least one end fluidly coupled to the airbag within the collar and at least an opposite end disposed along a back side of the seat back opposite the occupant support area, and at least one inflator having at least one gas outlet fluidly coupled to the at least an opposite end of the at least one filler tube, the at least one inflator configured to inflate and deploy the airbag.

BRIEF DESCRIPTION OF THE DRAWINGS

This disclosure is illustrated by way of example and not by way of limitation in the accompanying figures. Where considered appropriate, reference labels have been repeated among the figures to indicate corresponding or analogous elements.

DETAILED DESCRIPTION OF THE DRAWINGS

Figure 1:
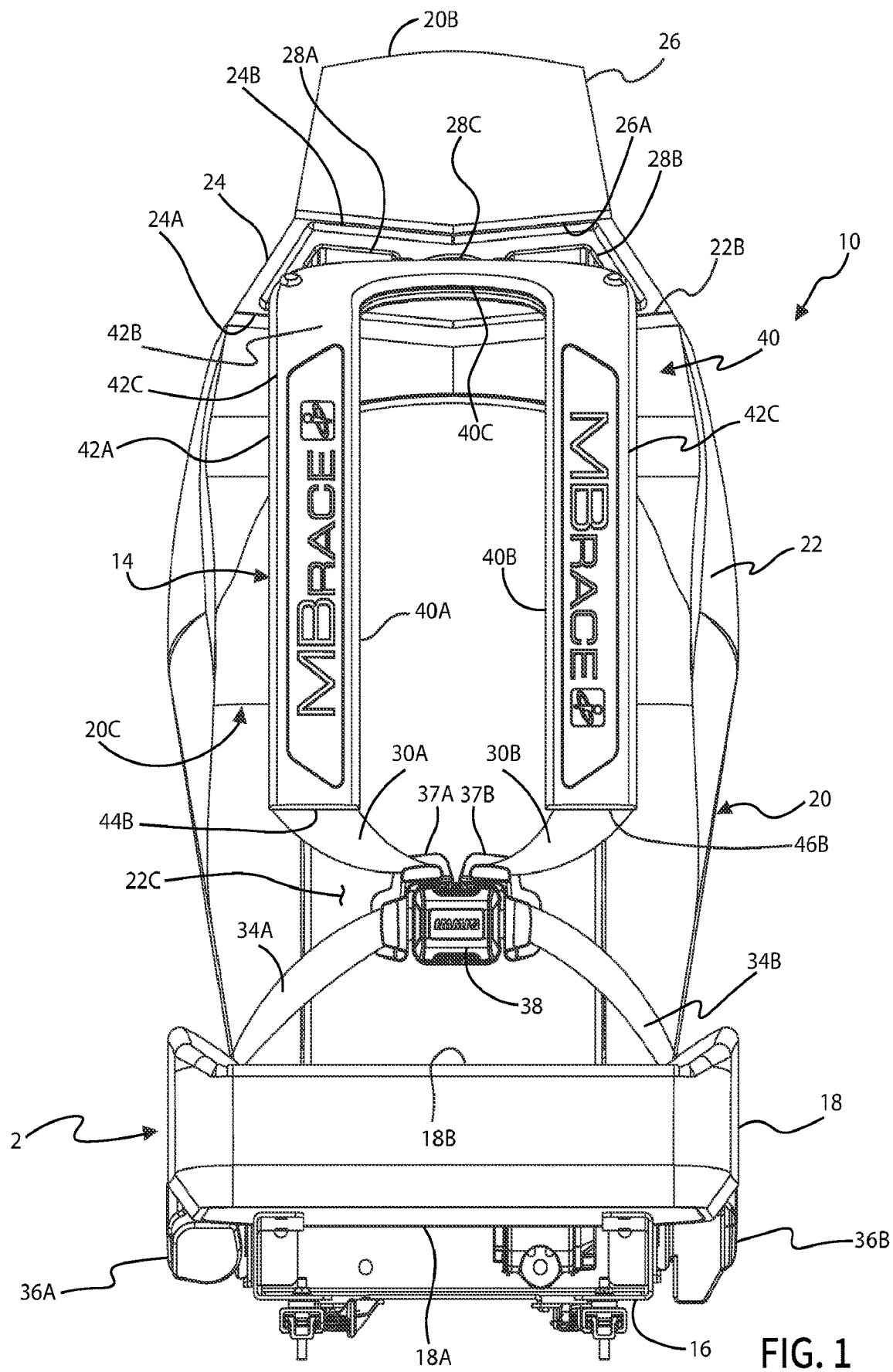
FIG. 1 is a front elevational view of an embodiment of a motor vehicle seat and occupant restraint system illustrating an embodiment of the occupant restraint system in the form of a combination inflatable and web-based restraint.
Figure 2:
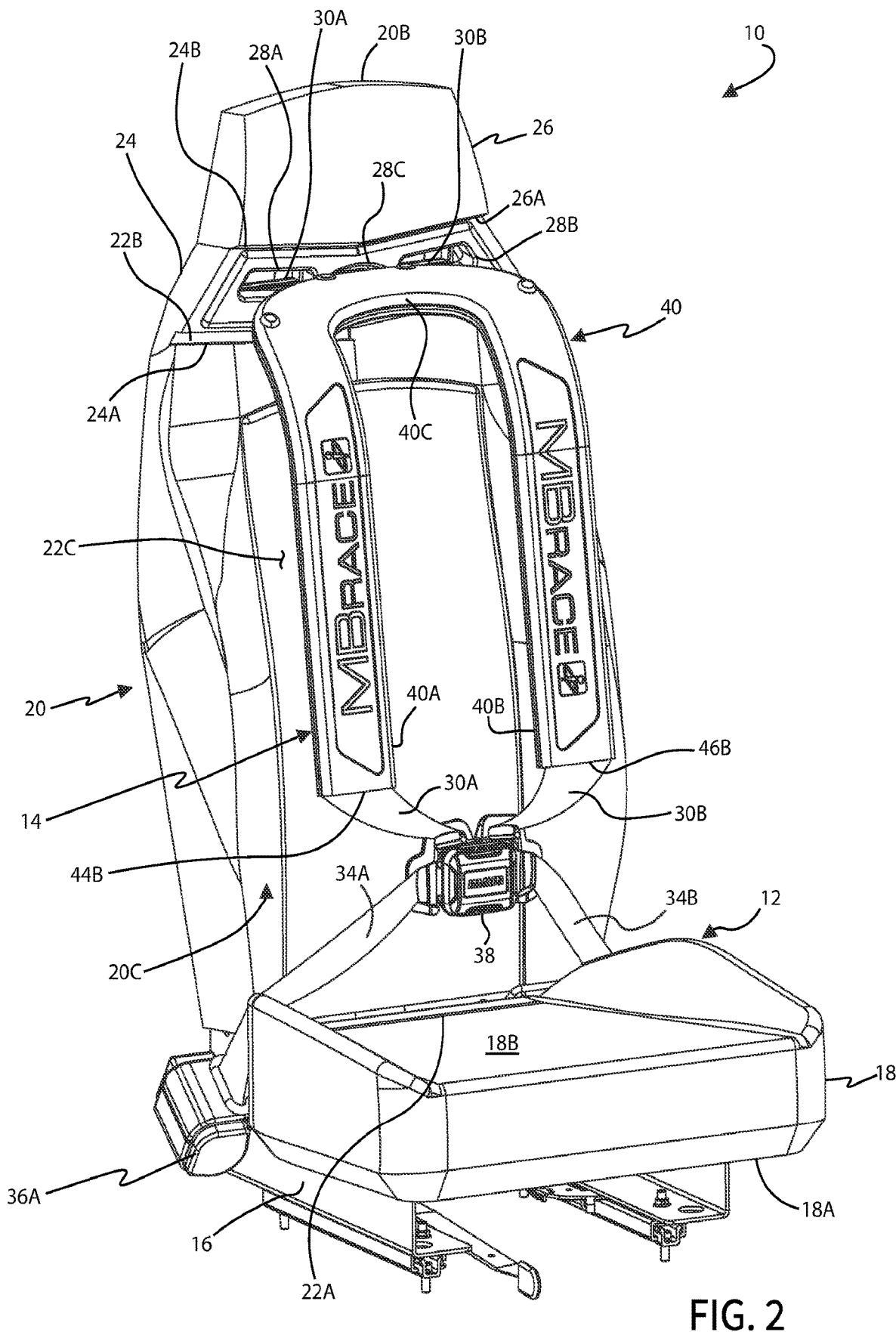
FIG. 2 is a front perspective view of the vehicle seat and occupant restraint system illustrated in FIG. 1.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure or characteristic is described in connection with an embodiment, it is submitted that it is within the knowledge of one skilled in the art to effect such feature, structure or characteristic in connection with other embodiments whether or not explicitly described. Further still, it is contemplated that any single feature, structure or characteristic disclosed herein may be combined with any one or more other disclosed feature, structure or characteristic, whether or not explicitly described, and that no limitations on the types and/or number of such combinations should therefore be inferred.

This disclosure relates to the combination of an occupant seat for a motor vehicle and an occupant restraint system coupled to the occupant seat for restraining an occupant of the seat, and further relates to an occupant restraint system including a combination of an inflatable restraint and a web-based restraint. The motor vehicle in which the occupant seat and occupant restraint system is to be mounted may be or include any land-based and/or water-based (e.g., any marine application) motor vehicle or any aircraft, without limitation, and/or may be or include any occupant transportation vehicle that is, or is configured to be, towed or pushed by a motor vehicle.

Referring now to FIGS. 1-4, an embodiment is shown of a combination 10 of an occupant seat 12 and occupant restraint system 14 for a motor vehicle, wherein the occupant restraint system 14 is provided in the form of a combination inflatable and web-based restraint. The occupant seat 12 illustratively includes a seat base 16 configured to be operatively mounted to a floor and/or one or more frame components of a motor vehicle, an occupant seat 18 coupled to the seat base 16 and configured to support an occupant thereon, and a seat back 20 also coupled to the seat base 16 and configured to support a torso of an occupant seated in the occupant seat 18. A bottom surface 18A of the occupant seat 18 is coupled to the seat base 16, and an opposite top surface 18B of the seat 18 is configured to receive and support an occupant of the seat 12 such that the top surface 18B of the seat bottom and the front or forward facing surface of the seat back 20 define an occupant support area therealong. A lower or bottom end 20A of the seat back 20 is mounted to the seat base 16 (and/or in some embodiments to the occupant seat 18), and the seat back 20 extends upwardly away from the seat 18 to a top end 20B of the seat back 20. A front 20C surface of the seat back 20 faces forward in the motor vehicle, and the opposite surface 20D defines the back or back surface of the seat back 20.

In the illustrated embodiment, the seat back 20 includes an occupant support portion 22 having a bottom or lower end 22A at, just above or just below the top surface 18B of the occupant seat, and the occupant support portion 22 extends upwardly away from the bottom end 22A to an opposite top end 22B. In one embodiment, the top end 22B is positioned relative to the seat back 20 to be at or near shoulder height of an average occupant of the seat 12, although in other embodiments the top end 22B of the occupant support portion 22 may be higher or lower. In any case, a front surface 22C of the occupant support portion 22 faces forward in the motor vehicle and may be configured, e.g., contoured, to receive and support the back portion of the torso of an average occupant of the seat 12. The seat back 20 further includes an occupant restraint guide 24 having a lower or bottom end 24A coupled to the top end 22B of the occupant support portion 22, and a top end coupled to the bottom end 26A of a headrest 26, wherein the top of the headrest 26 defines the top 20B of the seat back 20. In the embodiment illustrated in FIGS. 1-4, the occupant restraint guide 24 defines three openings 28A, 28B, 28C therethrough from the front 20C of the seat back 20 through the rear 20D of the seat back. The opening 28A is illustratively positioned to reside just above the right shoulder of an average occupant of the seat 12, the opening 28B is illustratively positioned to reside just above the left should of the average occupant of the seat 12, and the opening 28C is illustratively positioned between the openings 28A, 28B. In some alternate embodiments (see FIGS. 8A-9B for examples), the opening 28C may be omitted. In some alternate embodiments in which the seat back 20 is designed such that shoulder webs of the restraint system 14 extend over (not through) the seat back 20, at least the openings 28A, 28B, and in some cases also the opening 28C, may be omitted.

In the embodiment illustrated in FIGS. 1-4, the occupant restraint system 14 includes a combination of an inflatable and web-based restraint, both at least partially housed in an occupant restraint collar 40 positioned along the front 22C of the seat back 20. In the illustrated embodiment, the occupant restraint collar 40 is in the shape of an inverted "U", having two downwardly-extending and spaced-apart (and approximately parallel) legs 40A, 40B joined at their upper ends by an arcuate section 40C. As depicted by example in FIG. 6, the collar 40 is illustratively sized and shaped such that the arcuate section 40C extends about a rear portion of the neck 60D and over the shoulders 60B, 60C of an average sized occupant 60 of the seat 12, and the legs 40A, 40B extend downwardly from each respective shoulder 60B, 60C along the front portion of the torso 60A of the occupant 60. In alternate embodiments, the section 40C may have a non-arcuate shape and/or the legs 60B, 60C may be non-parallel relative to one another. In one embodiment, the collar 40 is formed of a conventional polymer or combination of polymers, although in alternate embodiments the collar 40 may be form of other conventional materials or of a combination of one or more polymers and other conventional materials.

In the illustrated embodiment, the web-based portion of the inflatable and web-based restraint 14 illustratively comprises a restraint harness including a first shoulder web 30A coupled at one end to a web retractor 32A secured to the seat base 16 adjacent to the back 20D of the seat back 20, and having an opposite end extending from the retractor 32A upwardly along the back 20D of the seat back 20 and through the opening 28A defined through the occupant restraint guide 24. As further illustrated in FIG. 5A, the opposite end of the shoulder web 30A extends from the opening 28A downwardly into an opening 44A in the arcuate portion 40C of the occupant restraint collar 40 and through the leg 40A of the collar 40, and then extends out of the leg 40A through an opening 44B in the free end of the leg 40A and into engagement with tongue or buckle structure 37A. In alternate embodiments, the shoulder web 30A may extend through one or more slots, channels or other web retainers defined or positioned on or along the back, side or front of the leg 40A of the collar 40. The web-based portion of the inflatable and web-based restraint 14, i.e., the restraint harness, further includes a second shoulder web 30B coupled at one end to another web retractor 32B secured to the seat base 16 adjacent to the back 20D of the seat back 20 and spaced apart from the web retractor 32A, and having an opposite end extending from the retractor 32B upwardly along the back 20D of the seat back 20 and through the opening 28B defined through the occupant restraint guide 24. As further illustrated in FIG. 5A, the opposite end of the shoulder web 30B extends from the opening 28B downwardly into an opening 46A in the arcuate portion 40C of the occupant restraint collar 40 and through the leg 40B of the collar 40, and then extends out of the leg 40B through an opening 46B in the free end of the leg 40B and into engagement with buckle or tongue structure 37B. In alternate embodiments, the shoulder web 30B may extend through one or more slots, channels or other web retainers defined or positioned on or along the back, side or front of the leg 40B of the collar 40. In any case, one of the structures 37A, 37B is coupled to a buckle 38 defining a tongue slot therein, and the other is outfitted with a correspondingly configured tongue such that the two structures 37A, 37B can be releasably engaged with one another via the buckle 38. In some alternate embodiments, the web retractor 32A and/or the web retractor 32B may instead be secured to the floor and/or to a frame component of the motor vehicle in which the seat 12 is installed. In some alternate embodiments, the shoulder webs 30A, 30B may be coupled to, or merged into, one end of a single web having an opposite end coupled to a web retractor secured to the seat base 16 or to the floor or frame component of the motor vehicle.

Figure 5A:
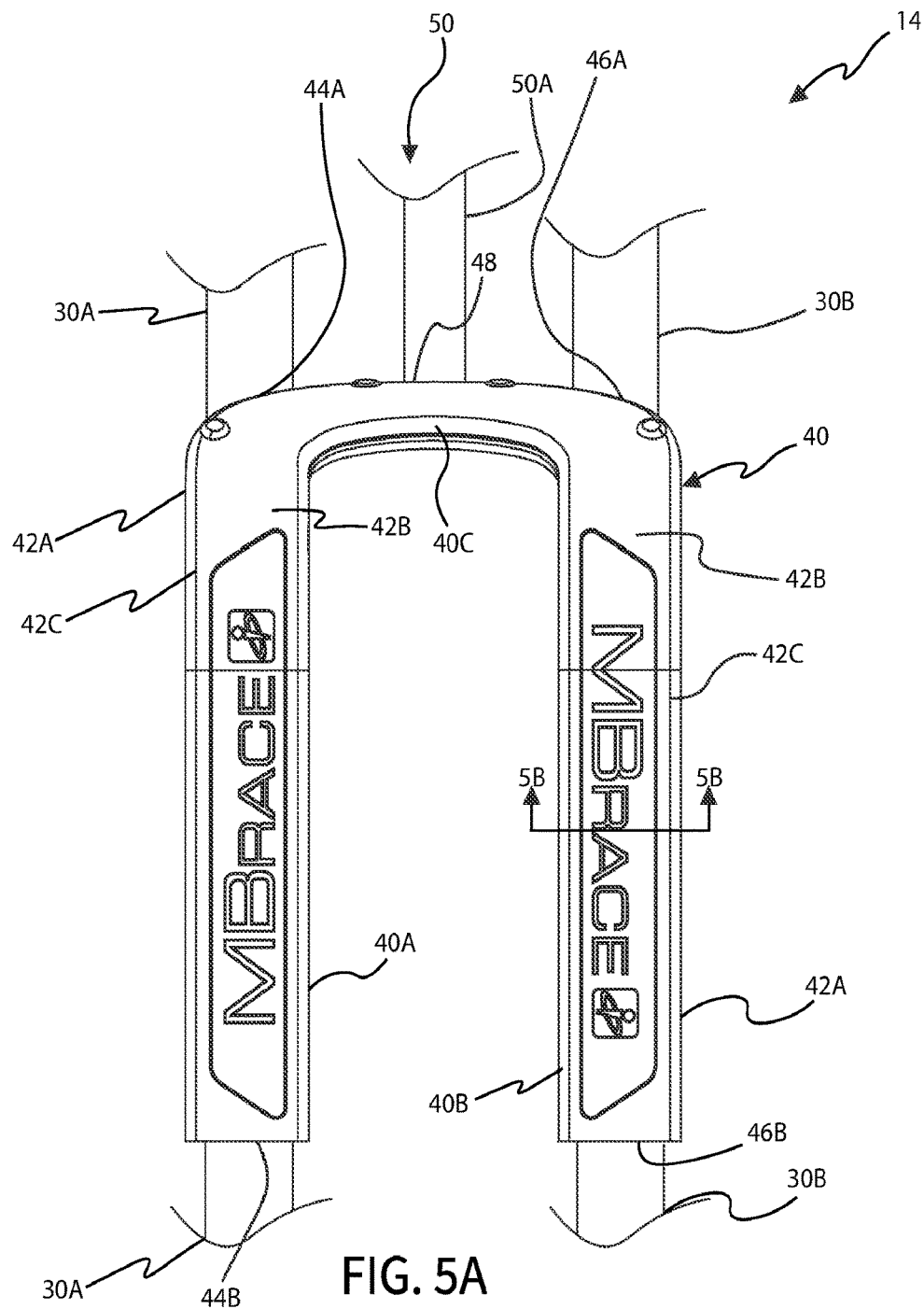
FIG. 5A is a front elevational view of a portion of the combination inflatable and web-based restraint illustrated in FIGS. 1-4.

As best shown in FIG. 5A (and also in FIG. 7), the occupant restraint collar 40 illustratively includes a lower or rear compartment 42A which extends about the periphery of the collar 40 and which faces the front 20C of the seat back 20 (or faces an occupant when the occupant is seated in the seat 12), and an upper or front flap or wall 42B which also extends about the periphery of the collar 40 over the lower or rear compartment 42A and which faces forward of the vehicle seat 12. The compartment 42A and the flap or wall 42B are illustratively joined together at a seam 42C which extends about the periphery of the collar 40 adjacent to an outer edge of the collar 40 as illustrated by example in FIG. 5A. In one embodiment, the openings 44A and 46A are illustratively formed through the lower or rear compartment 42A, although in alternate embodiments the openings 44A and 46A may be formed by and between the lower or rear compartment 42A and the flap or wall 42B. The openings 44 and 46B are illustratively formed by and between the lower or rear compartment 42A and the flap or wall 42B. In the illustrated embodiment, the shoulder webs 30A, 30B are not attached or otherwise coupled to the collar 40 but instead pass through the each respective leg 40A, 40B such that the collar 40 is movable along, and with respect to, each shoulder web 30A, 30B.

The web-based portion of the inflatable and web-based restraint 14, i.e., the restraint harness, further includes a first lap web 34A coupled at one end to another web retractor 36A secured to one side of the seat base 16 adjacent to the seat bottom 18 or to the floor or frame component of the motor vehicle adjacent to the seat bottom 18, and having an opposite end extending from the retractor 36A and into engagement with the tongue or buckle structure 37A. The restraint harness further includes a second lap web 34B is coupled at one end to yet another web retractor 36B secured to an opposite side of the seat base 16 adjacent to the seat bottom 18 or to the floor or frame component of the motor vehicle adjacent to the seat bottom 18, and having an opposite end extending from the retractor 36B and into engagement with the buckle or tongue structure 37B. In the illustrated embodiment, the shoulder web 30A and the lap web 34A are coupled together via the tongue or buckle structure 37A, and the shoulder web 30B and the lap web 34B are coupled together via the buckle or tongue structure 37B, such that the shoulder web 30A and lap web 34A are together releasably engageable with the shoulder web 30B and lap web 34B via the buckle 38. In alternate embodiments, one or more of the webs 30A, 30B, 34A, 34B may be individually and separately releasably engageable with the buckle 38.

The web-based portion of the inflatable and web-based restraint 14, i.e., the restraint harness, illustrated by example in FIGS. 1-4 is implemented in the form of a four-point restraint system. In alternate embodiments, the restraint harness of the inflatable and web-based restraint 14 may include more or fewer points of restraint, two examples of which are illustrated in FIGS. 17A and 17B and will described in detail below.

Figure 3:
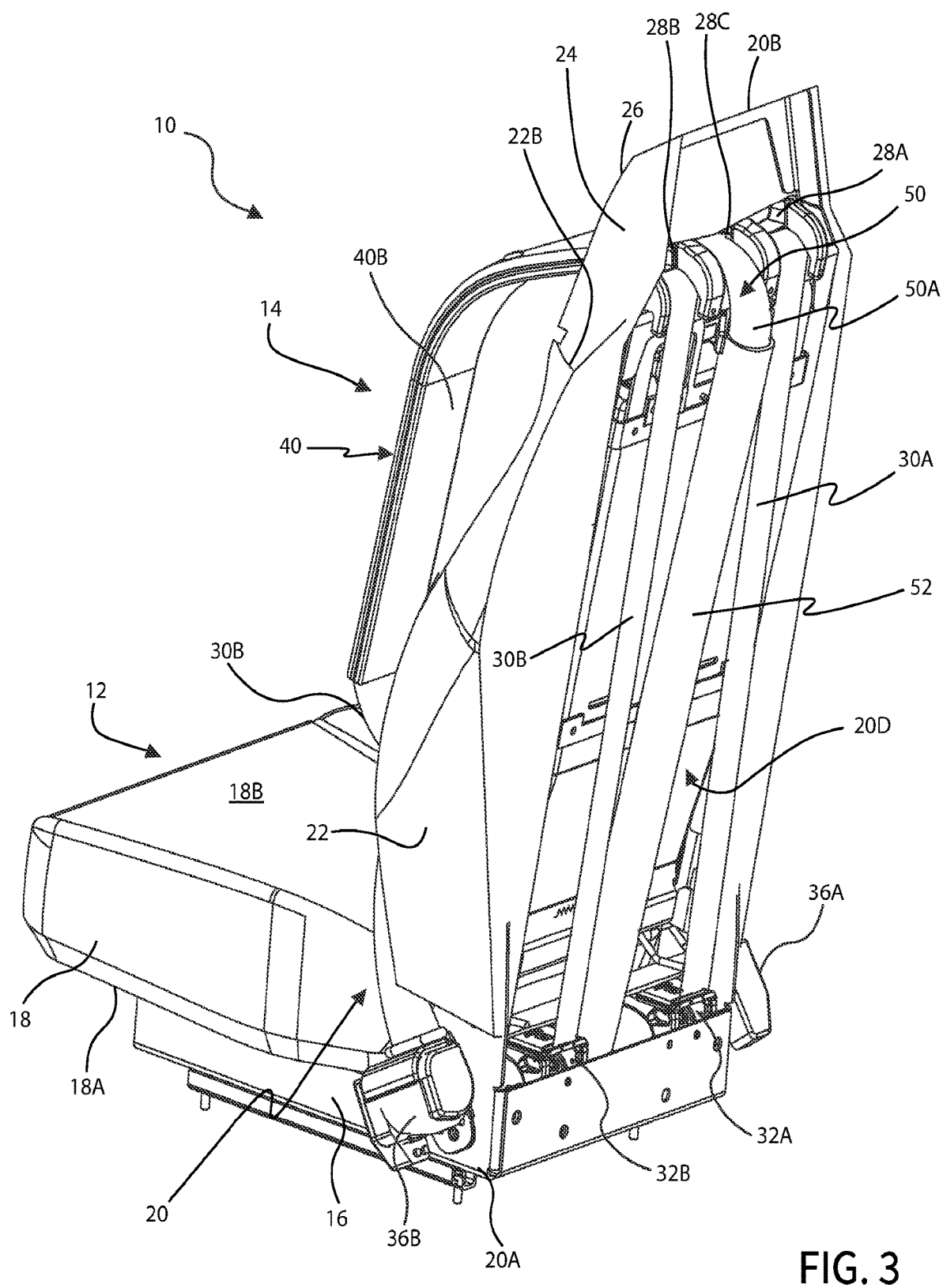
FIG. 3 is a rear perspective view of the vehicle seat and occupant restraint system illustrated in FIGS. 1 and 2.
Figure 4:
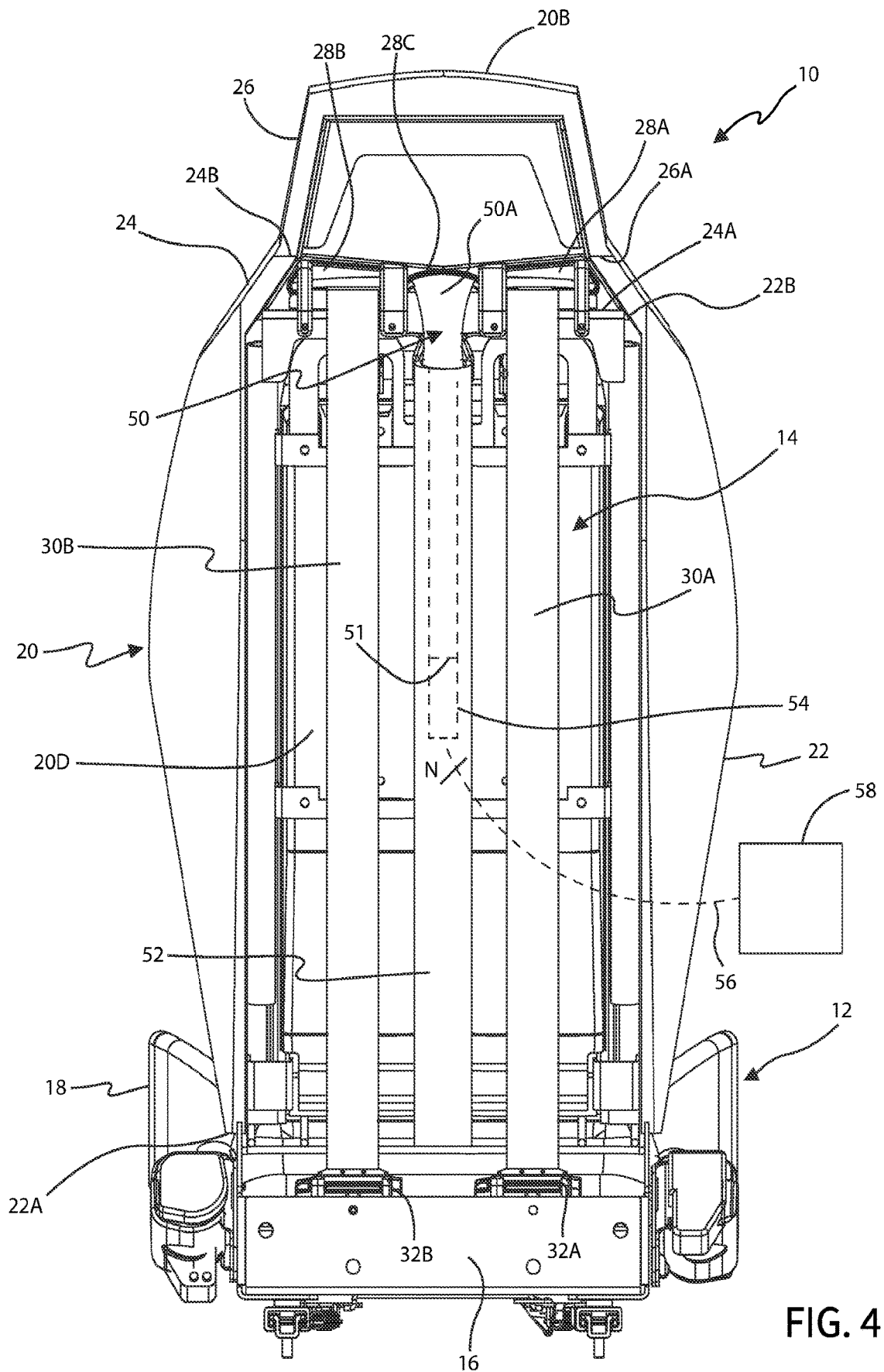
FIG. 4 is a rear elevational view of the vehicle seat and occupant restraint system illustrated in FIGS. 1-3.

In the embodiment illustrated in FIGS. 1-4, the inflatable portion of the inflatable and web-based restraint 14 illustratively includes a flexible, inflatable airbag 50, a portion of which is housed within the occupant restraint collar 40 and another portion of which extends through the opening 28C defined through the occupant restraint guide 24 and downwardly along the back 20D of the seat back 20 and into engagement with an inflator 54. As best shown in FIGS. 3 and 4, the airbag 50 includes a single filler tube 50A having an open lower end 51 extending downwardly into a guide tube 52 and into operative engagement with an airbag inflator 54. The inflator 54 is electrically actuatable, and is electrically connected to an external control module 58 via a number, N, of electrical wires 56. In the illustrated embodiment, the inflator 54 includes at least one canister of compressed gas and an electrically controlled actuator which is responsive to an activation signal produced by the control module 58 to cause release the pressurized gas into the filler tube 50A to rapidly inflate the airbag 50 in a conventional manner. The electrically controlled actuator may illustratively be an electrically actuated solenoid, pyrotechnic actuator or other conventional electrically controlled actuator. In alternate embodiments in which the motor vehicle is equipped with a source of pressurized gas (e.g., air), the inflator 54 may be omitted and the electrical wires 56 depicted in FIG. 4 may instead represent an air hose or tube and the control module 58 depicted in FIG. 4 may instead represent a source of pressurized air such that the air hose or tube 56 is coupled to and between the filler tube 50A and the source 58 of pressurized gas.

The guide tube 51 is illustratively attached to the back 20D of the seat back 20 and thus fixed in position relative to the seat 12. The filler tube 50A, inflator 54 operatively coupled thereto and wires 56 electrically connected to the inflator 54 are together movable within and relative to the guide tube 52 so that the occupant restraint collar 40 is thereby movable toward and away from the front surface 20C of the seat back 20. As an occupant is seated in the seat 12 and fits the restraint 14 over the shoulders and about the torso and engages the buckle 38, the filler tube 50A is movable in and/or out of the opening 28C defined through the occupant restraint guide 24 to accommodate this movement. Likewise, as the motor vehicle is operated under non-deployment conditions, the filer tube 50A is movable in and/or out of the opening 28C so as not to impede movement of the shoulder webs 30A, 30B in response to the normal movement of the occupant under such conditions.

Figure 5B:
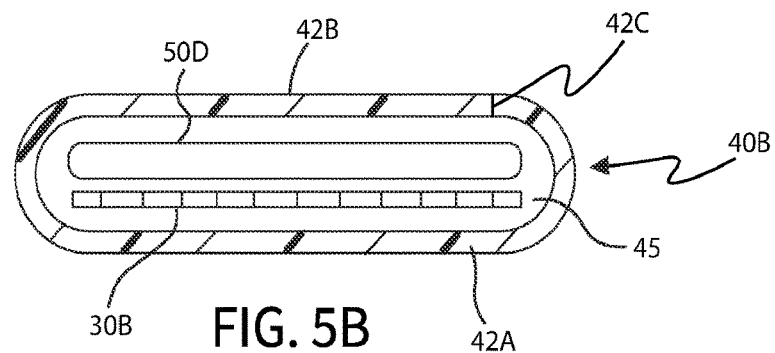
FIG. 5B is a cross-sectional view of the combination inflatable and web-based restraint as viewed along section lines 5B-5B of FIG. 5A.
Figure 7:
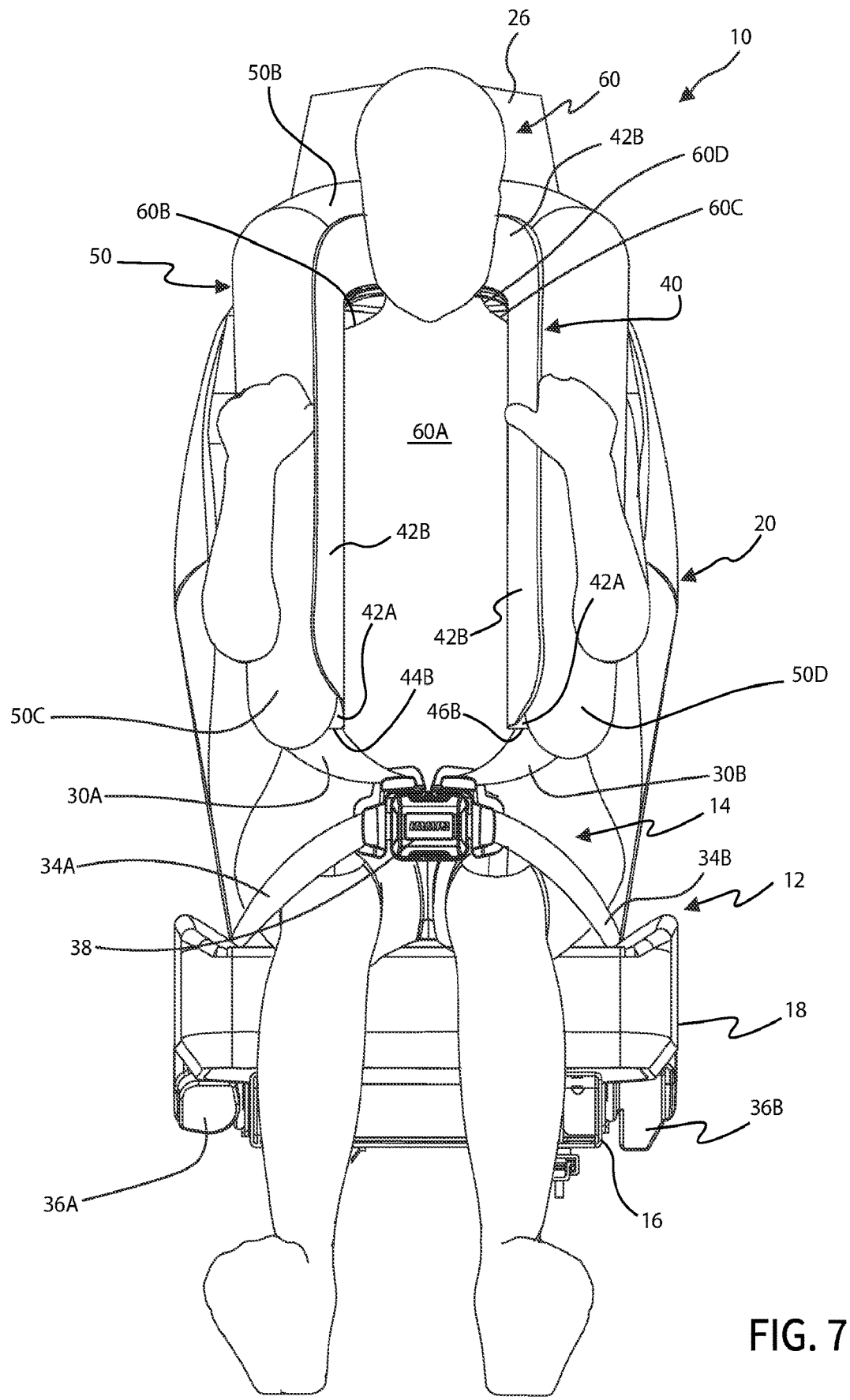
FIG. 7 is a front elevational view of the vehicle seat and occupant restraint system similar to FIG. 6 showing the inflatable restraint deployed over and about the occupant of the vehicle seat.

Referring now to FIG. 7, the airbag 50 illustratively has the same general shape as the occupant restraint collar 40, e.g., an inverted U-shape, and includes an arcuate portion 50B which is fluidly coupled to the filler tube 50A, and a pair of leg portions 50C, 50D which extend downwardly away from the arcuate portion 50B. The airbag 50 is illustratively sized such that the arcuate portion 50B extends about the back of the occupant's neck 60D and over each of the occupant's shoulders 60B, 60C, and such that the leg portions 50C, 50D extend downwardly toward the seat 18 on either side of the occupant's torso 60A. In the uninflated state of the airbag 50, it is housed within the occupant restraint collar 40, with the arcuate portion 50B residing in the arcuate portion 40C of the collar 40 and with each leg portion 50C, 50D residing in the respective leg portion 40A, 40B of the collar 40. As illustrated by example in FIG. 5A, the filler tube 50A extends into the collar 40 via an opening 48 centrally located along the rear arcuate portion 40C of the collar 40. In one embodiment, the opening 48 is illustratively formed through the lower or rear compartment 42A, although in alternate embodiments the opening 48 may be formed by and between the lower or rear compartment 42A and the flap or wall 42B. As illustrated by example in FIG. 5B, the leg portion 50D of the airbag 50 and the shoulder web 30B together extend, one over the other, through the channel 45 defined between the lower or rear compartment 42A and the flap or wall 42B of the collar 40. The leg 40A of the collar 40 is similarly configured.

Figure 6:
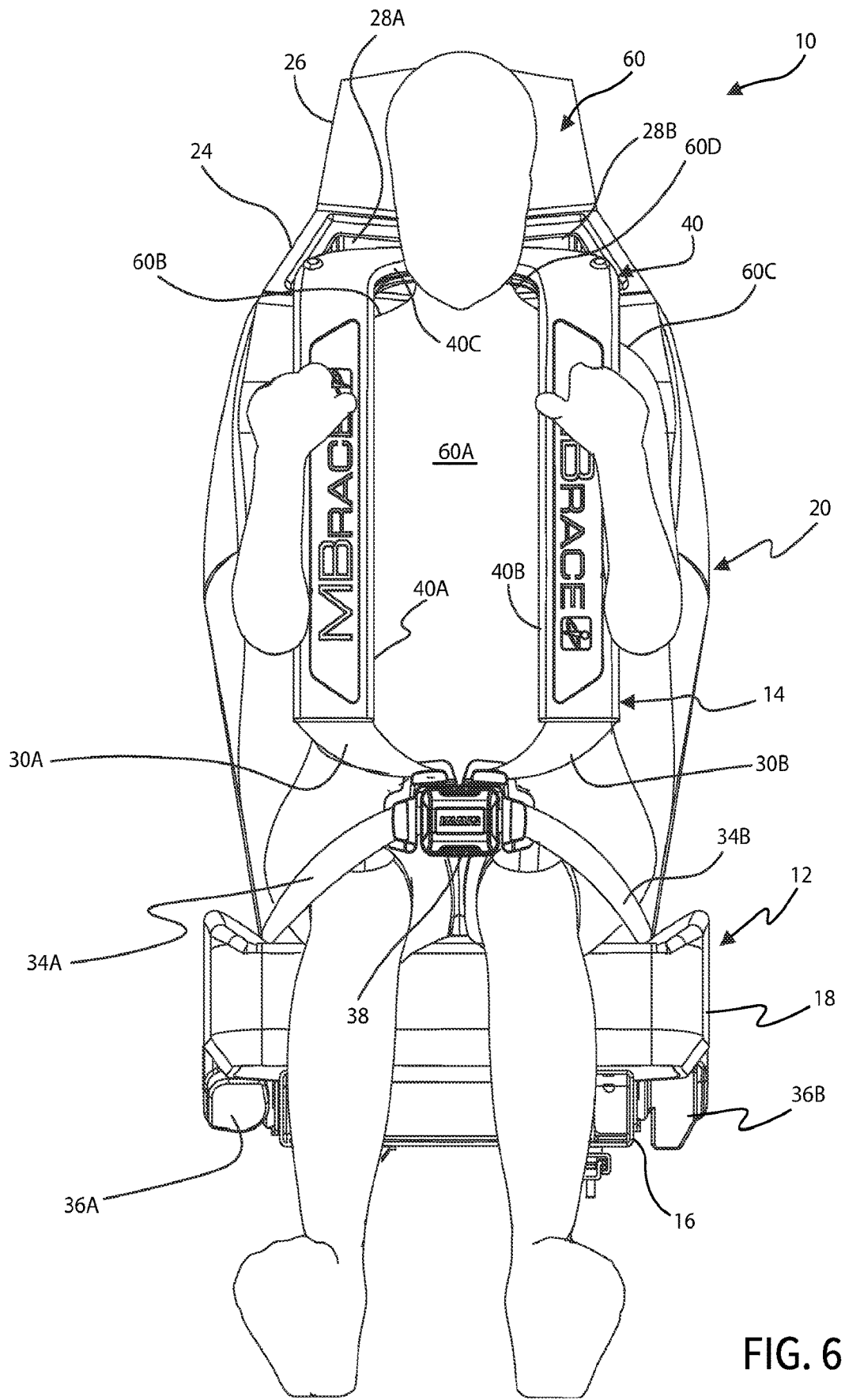
FIG. 6 is a front elevational view of the vehicle seat and occupant restraint system illustrated in FIGS. 1-5B shown with an occupant seated in the vehicle seat and the occupant restraint system engaged over the occupant to restrain the occupant in the seat.

FIG. 6 illustrates the occupant restraint 14 in the undeployed state of the airbag 50, e.g., during normal, non-deployment operation of the motor vehicle. In this mode, the arcuate portion 40C of the occupant restraint collar extends about the occupants neck 60D and shoulders 60B, 60C and the legs 40A, 40B of the collar extend downwardly toward the seat 18 on either side of the occupant's torso 60A. FIG. 7 illustrates the occupant restraint 14 in the deployed state of the airbag 50, e.g., during impact or impending impact, rollover or the like. As the airbag 50 inflates, the growing volume of gas in the airbag components 50B, 50C, 50D causes the seam 42C between the lower or rear compartment 42A and the flap or wall 42B to open, which pushes the flap or wall 42B toward the occupant 60 such that the flap or wall 42B surrounds the neck 60D, shoulders 60B, 60C and torso 60A of the occupant 60. In one embodiment, the occupant restraint collar 40 is formed of a synthetic polymer such as Nylon®, although in alternate embodiments the occupant restraint collar 40 may be formed of one or more other conventional materials which may be flexible or semi-rigid.

Figures 8A, 8B:
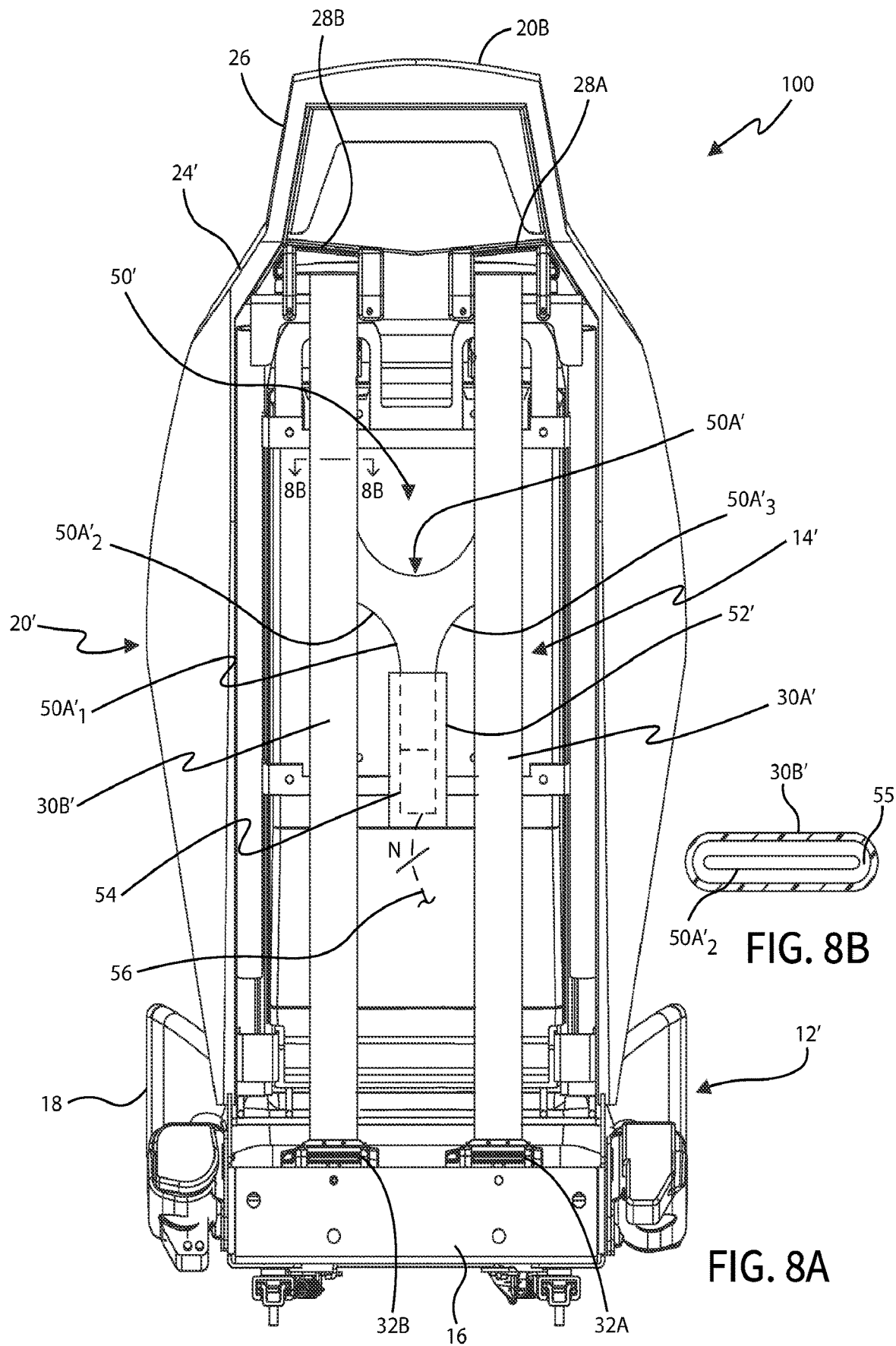
FIG. 8A is a rear elevational view of another embodiment of a motor vehicle seat and occupant restraint system illustrating another embodiment of the occupant restraint system in the form of another combination inflatable and web-based restraint.
FIG. 8B is a cross-sectional view of the combination inflatable and web-based restraint shown in FIG. 8A as viewed along section lines 8B-8B of FIG. 8A.

Referring now to FIGS. 8A and 8B, an alternate embodiment is shown of a combination 100 of an occupant seat 12' and occupant restraint system 14' for a motor vehicle, wherein the occupant restraint system 14' is provided in the form of a combination inflatable and web-based restraint. In this alternate embodiment, the occupant seat 12' is identical in many respects to the occupant seat 12 illustrated in FIGS. 1-7 and described above, and differs from the occupant seat 12 only in the omission of the opening 28C defined through the occupant restraint guide 24' of the seat back 20'.

In the embodiment illustrated in FIGS. 8A and 8B, the shoulder webs 30A', 30B' are illustratively both provided in the form of web tubes, and the filler tube 50A' of the airbag 50' is illustratively provided in the form of a split or "Y" tube with one portion $50A'_1$ extending downwardly into operative engagement with the inflator 54, with another portion $50A'_2$ in fluid communication with the filler tube portion $50A'_1$ extending through a channel 55 defined through the shoulder web 30B' and into engagement with the arcuate portion 50B of the airbag 50, and with yet another portion $50A'_3$ in fluid communication with the filler tube portion $50A'_1$ extending through a similar channel defined through the shoulder web 30A' and also into engagement with the arcuate portion 50B of the airbag 50. In this embodiment, the filler tube portion $50A'_1$ (and inflator 54 and wiring 56) is movable within and along the guide tube 52' as described above so as not to impede movement of the shoulder webs 30A', 30B' in response to the normal movement of the occupant under non-deployment conditions, but the filler tube portions $50A'_2$ and $50A'_3$ ride along with and within the shoulder webs 30A', 30B' so that only the shoulder webs 30A', 30B' extend through the occupant restraint guide member 24.

Figure 9A:
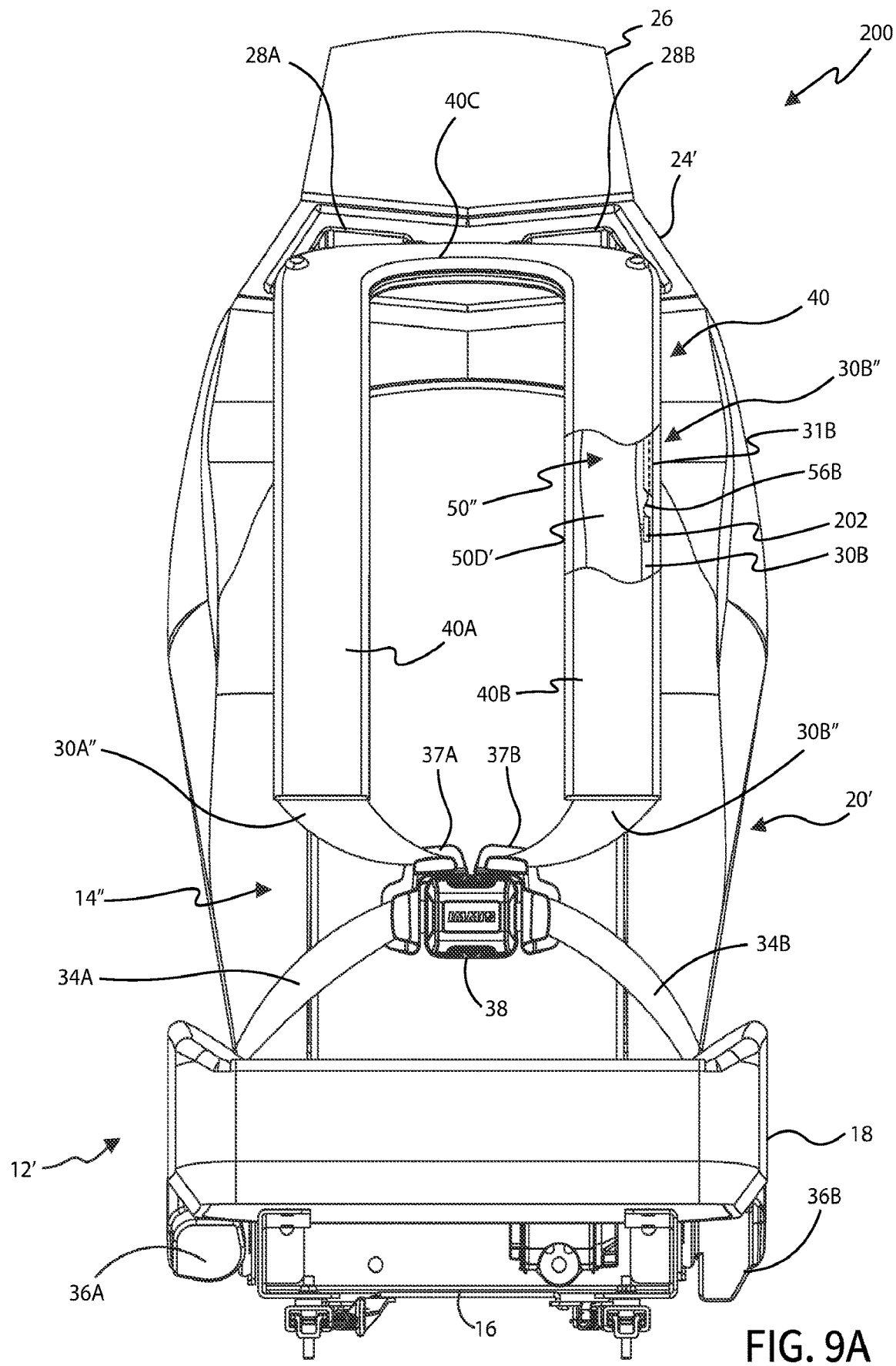
FIG. 9A is a front elevational view of yet another embodiment of a motor vehicle seat and occupant restraint system illustrating yet another embodiment of the occupant restraint system in the form of yet another combination inflatable and web-based restraint.
Figure 9B:
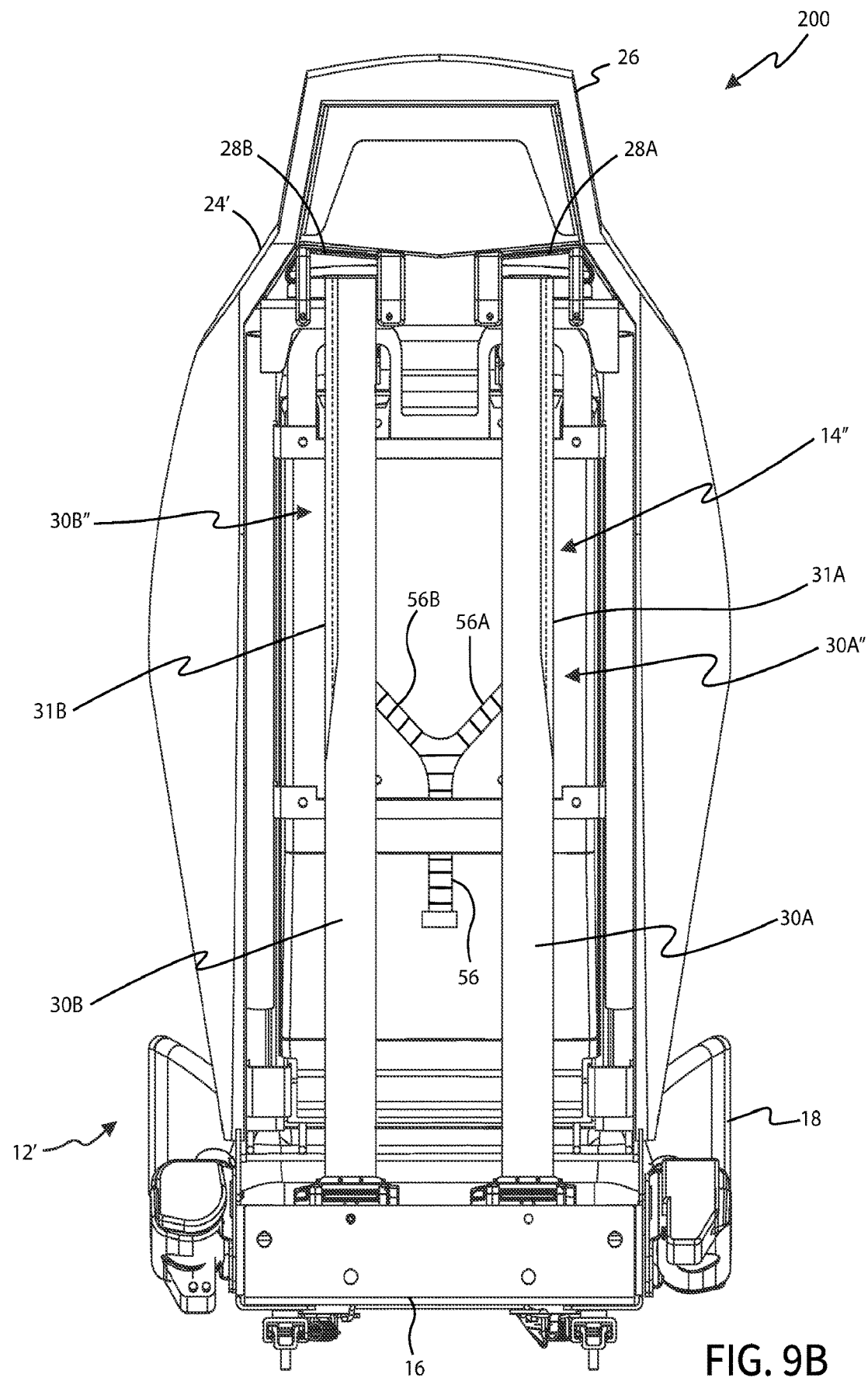
FIG. 9B is a rear elevational view of the embodiment of the motor vehicle seat and occupant restraint system illustrated in FIG. 9A.

Referring now to FIGS. 9A and 9B, another alternate embodiment is shown of a combination 200 of an occupant seat 12' and occupant restraint system 14" for a motor vehicle, wherein the occupant restraint system 14" is provided in the form of a combination inflatable and web-based restraint. In this alternate embodiment, the occupant seat 12' is identical to the occupant seat 12' illustrated in FIG. 8A and differs from the seat 12 illustrated in FIGS. 1-7 in that the opening 28C defined through the occupant restraint guide 24' of the seat back 20' is omitted.

In the embodiment illustrated in FIGS. 9A and 9B, the inflator 54 illustrated in FIGS. 4 and 8A and described above is omitted from the back 20D of the seat back 20', and small inflators are fluidly coupled directly to each of the leg portions of the airbag 50" and are housed within the occupant restraint collar 40. As depicted by example in FIG. 9A, a partial cutaway of the leg 40A shows a small inflator 202 housed within the leg 40B of the collar 40 and fluidly coupled directly to the leg portion 50D' of the airbag 50". The inflator 202 is electrically connected to wiring 56B (e.g., one or more wires) which is routed to the back 20D of the seat back 20' along the shoulder web 30B". In the illustrated embodiment, the leg 40A of the collar 40 likewise contains another inflator 202 fluidly coupled directly to the other leg portion of the airbag 50", and this inflator is similarly electrically connected to wiring 56A (e.g., one or more wires) which is routed to the back 20D of the seat back 20' along the shoulder web 30A". In some alternate embodiments, one of the inflators 202 may be omitted, and in other alternate embodiments one or more additional inflators 202 may be housed within the collar 40 and fluidly coupled directly to the airbag 50" and electrically connected to the wiring 56A and/or 56B. In any case, the airbag 50" in the embodiment illustrated in FIGS. 9A and 9B does not include the filler tube 50A and instead includes only the arcuate portion fluidly coupled to the two leg portions as described above with respect to FIG. 7.

In one embodiment, the wiring 56A, 56B is illustratively routed to the rear 20D of the seat back 20' by securing the wiring 56A, 56B to the webs 30A", 30B" respectively. In the embodiment illustrated in FIGS. 9A and 9B, for example, a channel member 31A is affixed to and between front and back surfaces of the shoulder web 30A to form the shoulder web 30A", and the channel member 31A defines a channel therethrough alongside the web 30A through which the wiring 56A is routed to the rear 20D of the seat back 20'. Likewise, another channel member 31B is affixed to and between front and back surfaces of the shoulder web 30B to form the shoulder web 30B", and the channel member 31B defines a channel therethrough alongside the web 30B through which the wiring 56B is routed to the rear 20D of the seat back 20'. The wiring 56A and 56B are joined to a wiring cable 56 via Y-connection or other suitable connection such that the inflators 202 can be actuated simultaneously during a deployment event.

Figure 10:
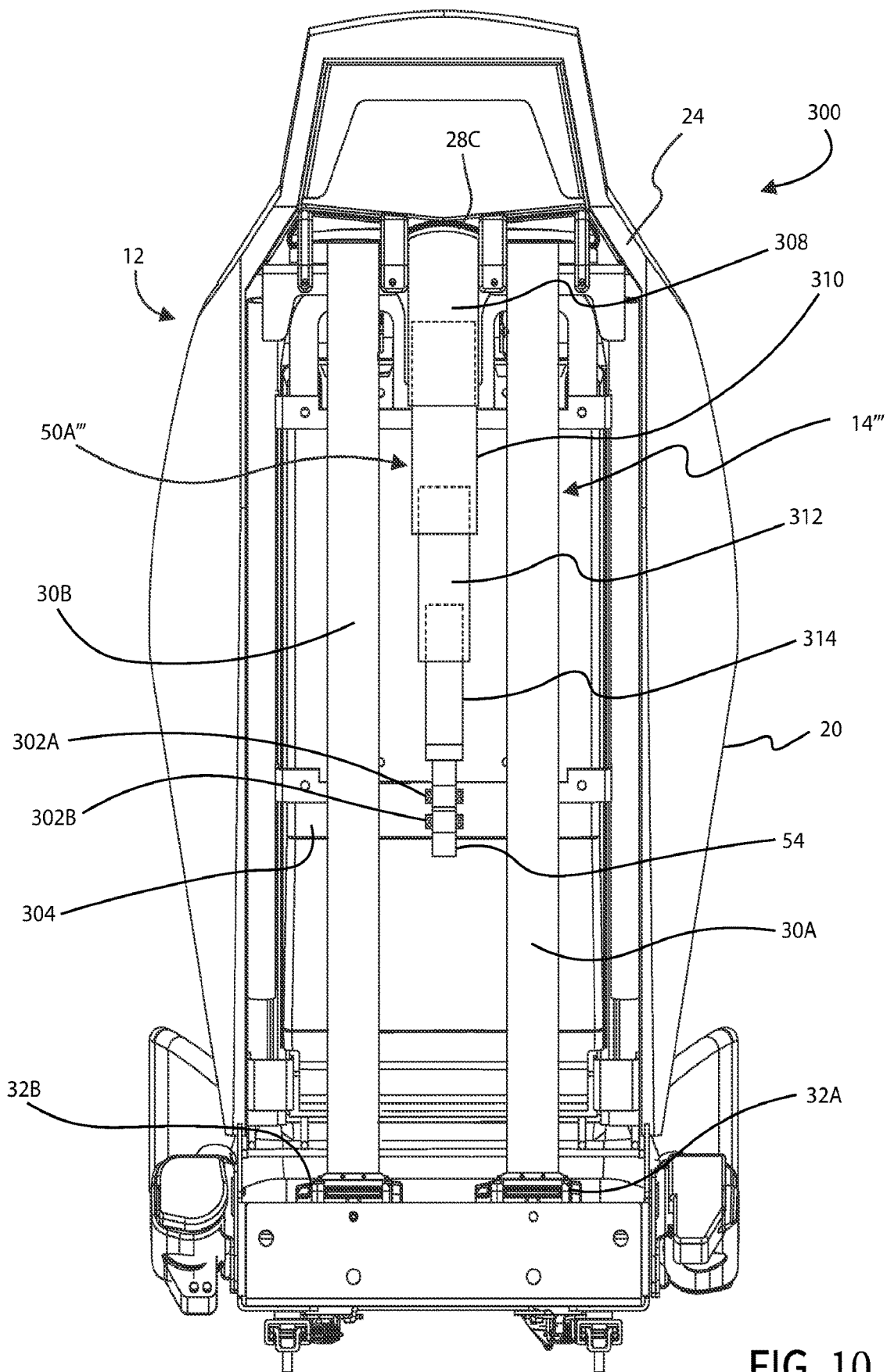
FIG. 10 is a rear elevational view of another embodiment of the occupant restraint system.

Referring now to FIG. 10, another alternate embodiment is shown of a combination 300 of an occupant seat 12 and occupant restraint system 14" for a motor vehicle, wherein the occupant restraint system 14" is provided in the form of a combination inflatable and web-based restraint. In this alternate embodiment, the occupant seat 12 is identical to the occupant seat 12 illustrated in FIGS. 1-7. The occupant restraint system 14" illustratively differs from the occupant restraint system 14 illustrated in FIGS. 1-7 and described above only in the configuration of the filler tube 50A". In this alternate embodiment, the filler tube 50A" illustratively includes two or more telescoping filler tube sections which deploy and retract as the shoulder webs 30A, 30B are respectively paid out of and taken up into the web retractors 32A, 32B. Such telescoping of the filler tube 50A" illustratively allows the inflator 54 to be secured, e.g., via straps or brackets 302A, 302B to a frame component 304 of the seat back 20. In the illustrated embodiment, the filler tube 50A" includes four fluidly-coupled telescoping sections 308, 310, 312 and 314 with the section 308 fluidly coupled to the airbag 50 (as described above), the section 314 fluidly coupled to a gas outlet of the inflator 54 and the sections 310 and 310 sequentially fluidly coupled therebetween. It will be understood that in alternate embodiments, the filler tube 50A" may include more or fewer such telescoping sections. Although not shown in FIG. 10, it will be further understood that the inflator 54 will be electrically connected to one or more wires for electrically activating the inflator 54 as described above.

Figure 11A:
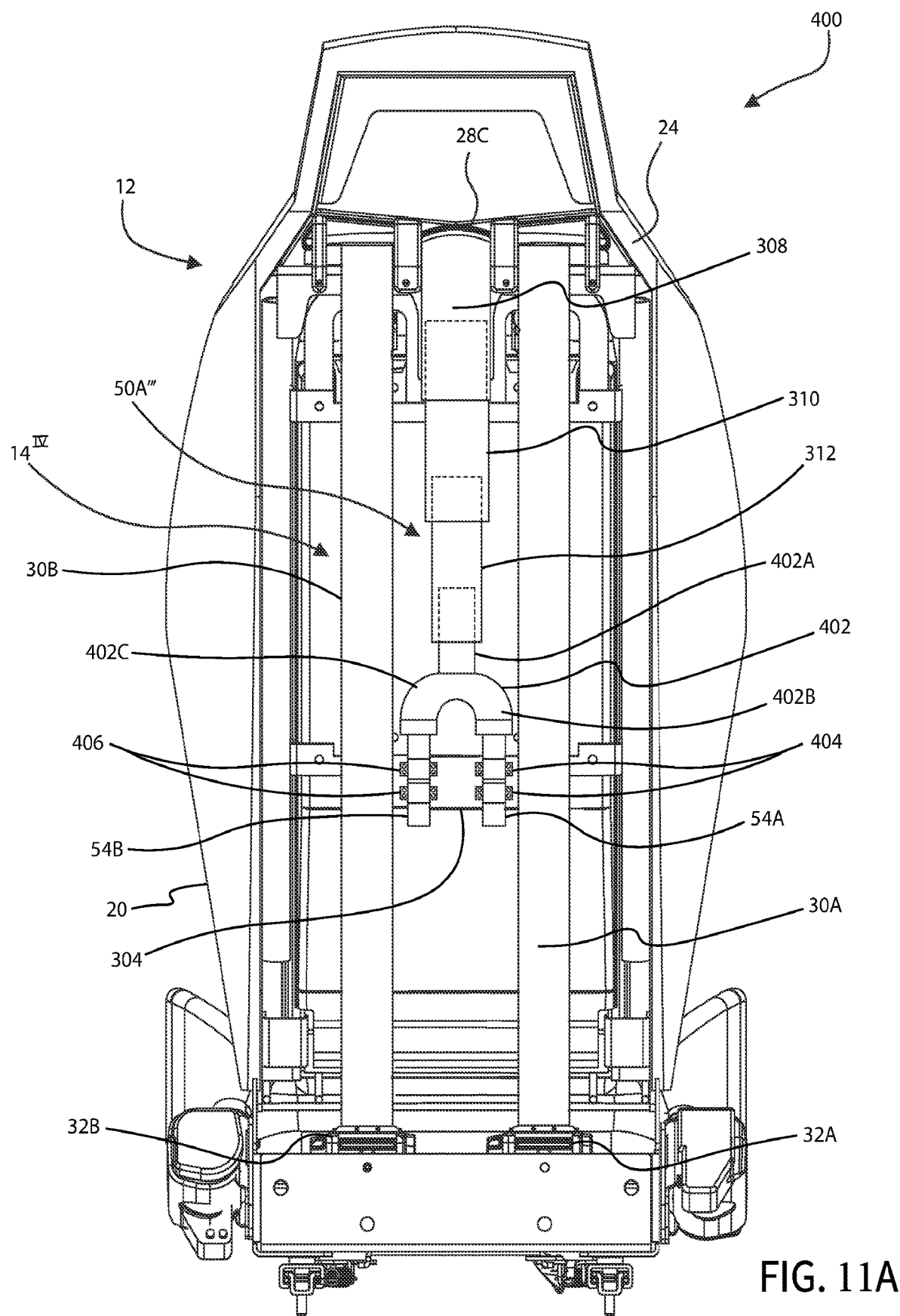
FIG. 11A is a rear elevational view of yet another embodiment of the occupant restraint system.

Referring now to FIG. 11A, another alternate embodiment is shown of a combination 400 of an occupant seat 12 and occupant restraint system $14^{IV}$ for a motor vehicle, wherein the occupant restraint system $14^{IV}$ is provided in the form of a combination inflatable and web-based restraint. In this alternate embodiment, the occupant seat 12 is identical to the occupant seat 12 illustrated in FIGS. 1-7. The occupant restraint system 14l illustratively differs from the occupant restraint system 14''' illustrated in FIG. 10 and described above only in the configuration of the bottom section of the filler tube 50A'''. In this alternate embodiment, the filler tube 50A''' illustratively includes two or more telescoping filler tube sections which deploy and retract as the shoulder webs 30A, 30B are respectively paid out of and taken up into the web retractors 32A, 32B as described above with respect to FIG. 10, with the last telescoping section 402 illustratively provided in the form of an inverted "Y" so as to provide for two gas inlets each configured to be operatively coupled to a respective one of two separate inflators 54A, 54B. Such telescoping of the filler tube 50A''' illustratively allows the inflator 54A, 54B to be secured, e.g., via straps or brackets 404, 406 respectively to the frame component 304 of the seat back 20. In the illustrated embodiment, the filler tube 50A''' includes four fluidly-coupled telescoping sections 308, 310, 312 as described above with the section 310 fluidly coupled to the airbag 50, and the section 402 having a single outlet 402A fluidly coupled to the section 312 and two separate inlets 402B, 402C configured to be fluidly coupled to a respective one of the inflators 54A, 54B. It will be understood that in alternate embodiments, the filler tube 50A''' may include more or fewer such telescoping sections. Although not shown in FIG. 11A, it will be further understood that the inflators 54A, 54B will both be electrically connected to one or more wires for electrically activating the inflators 54A, 54B.

Figure 11B:
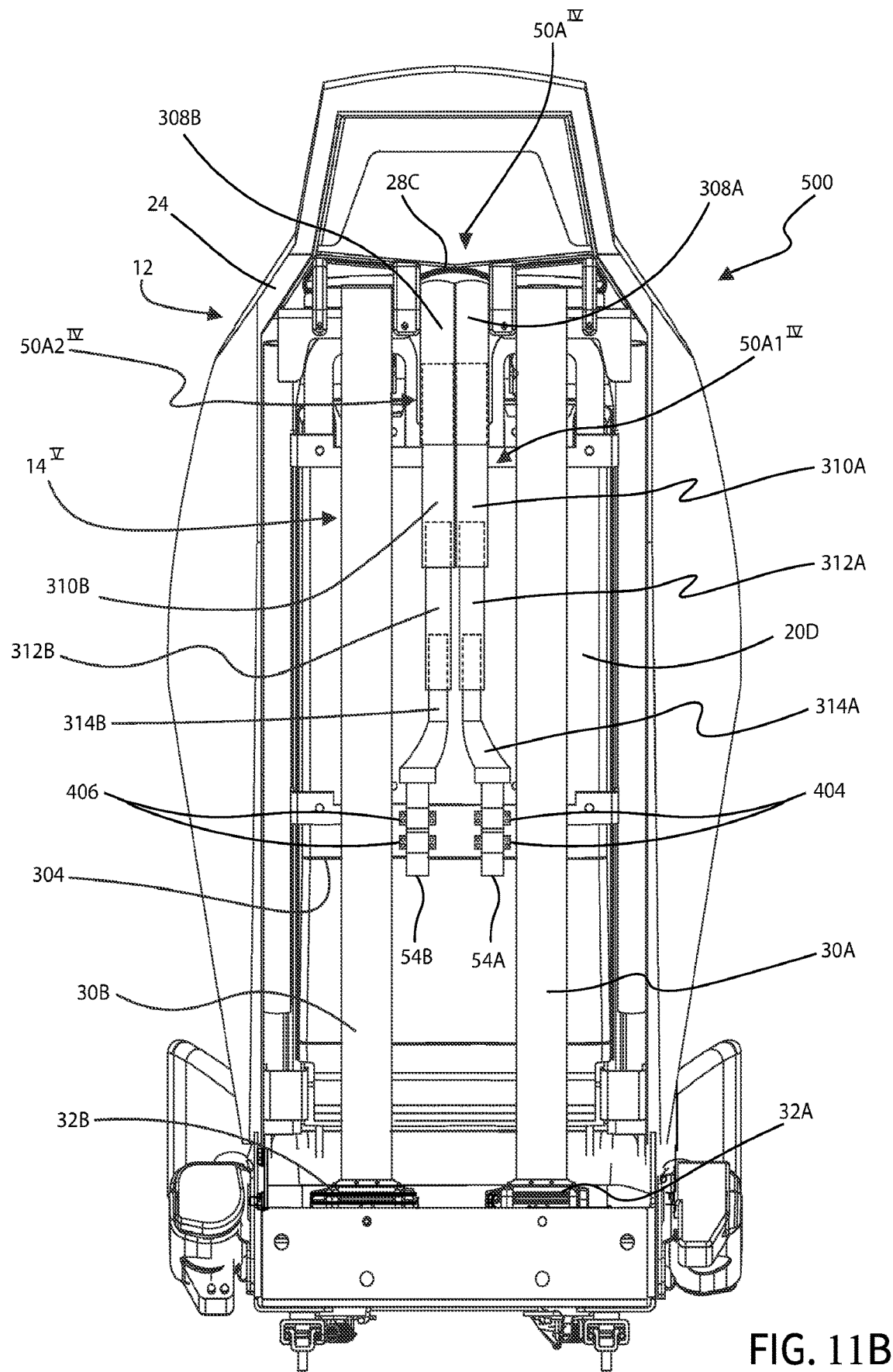
FIG. 11B is a rear elevational view of a further embodiment of the occupant restraint system.

Referring now to FIG. 11B, yet another alternate embodiment is shown of a combination 500 of an occupant seat 12 and occupant restraint system $14^V$ for a motor vehicle, wherein the occupant restraint system $14^V$ is provided in the form of a combination inflatable and web-based restraint. In this alternate embodiment, the occupant seat 12 is identical to the occupant seat 12 illustrated in FIGS. 1-7. The occupant restraint system $14^V$ illustratively differs from the occupant restraint system $14^{IV}$ illustrated in FIG. 11A and described above in that the telescoping filler tube is bifurcated into two separate telescoping filler tube sections $50A1^{IV}$ and $50A2^{IV}$. The filler tube sections $50A1^{IV}$, $50A2^{IV}$ are illustratively separate from each other, although in some embodiments the filler tube sections $50A1^{IV}$, $50A2^{IV}$ may be joined to one another at some point prior to fluidly coupling to the airbag 50. In any case, each filler tube section $50A1^{IV}$, $50A2^{IV}$ illustratively extends along the seat back 20D into fluid communication at one end with a respective one of two separate inflators 54A, 54B, and each extends through the opening 28C defined through the web guide 24 and into fluid communication with the airbag 50, such that the airbag 50 is inflated via two separate inflators 54A, 54B each through a separate, telescoping filler tube section $50A1^{IV}$, $50A2^{IV}$. In this alternate embodiment, the filler tube sections $50A1^{IV}$, $50A2^{IV}$ each illustratively include two or more telescoping filler tube sections which deploy and retract as the shoulder webs 30A, 30B are respectively paid out of and taken up into the web retractors 32A, 32B as described above with respect to FIG. 10. Such telescoping of the filler tube sections $50A1^{IV}$ and $50A2^{IV}$ illustratively allows the inflators 54A, 54B to be secured, e.g., via straps or brackets 404, 406 respectively to the frame component 304 of the seat back 20. In the illustrated embodiment, each filler tube sections $50A1^{IV}$, $50A2^{IV}$ includes four fluidly-coupled telescoping sections 308A and 308B, 310A and 310B, 312A and 312B and 314A, 314B respectively, with the sections 308A and 308B each fluidly coupled to the airbag 50, and with the sections 314A and 314B each fluidly coupled to a fluid outlet of a respective one of the inflators 54A, 54B. It will be understood that in alternate embodiments, the filler tube section $50A1^{IV}$ and/or the filler tube section $50A2^{IV}$ may include more or fewer such telescoping sections. Although not shown in FIG. 11B, it will be further understood that the inflators 54A, 54B will both be electrically connected to one or more wires for electrically activating the inflators 54A, 54B.

Figure 12:
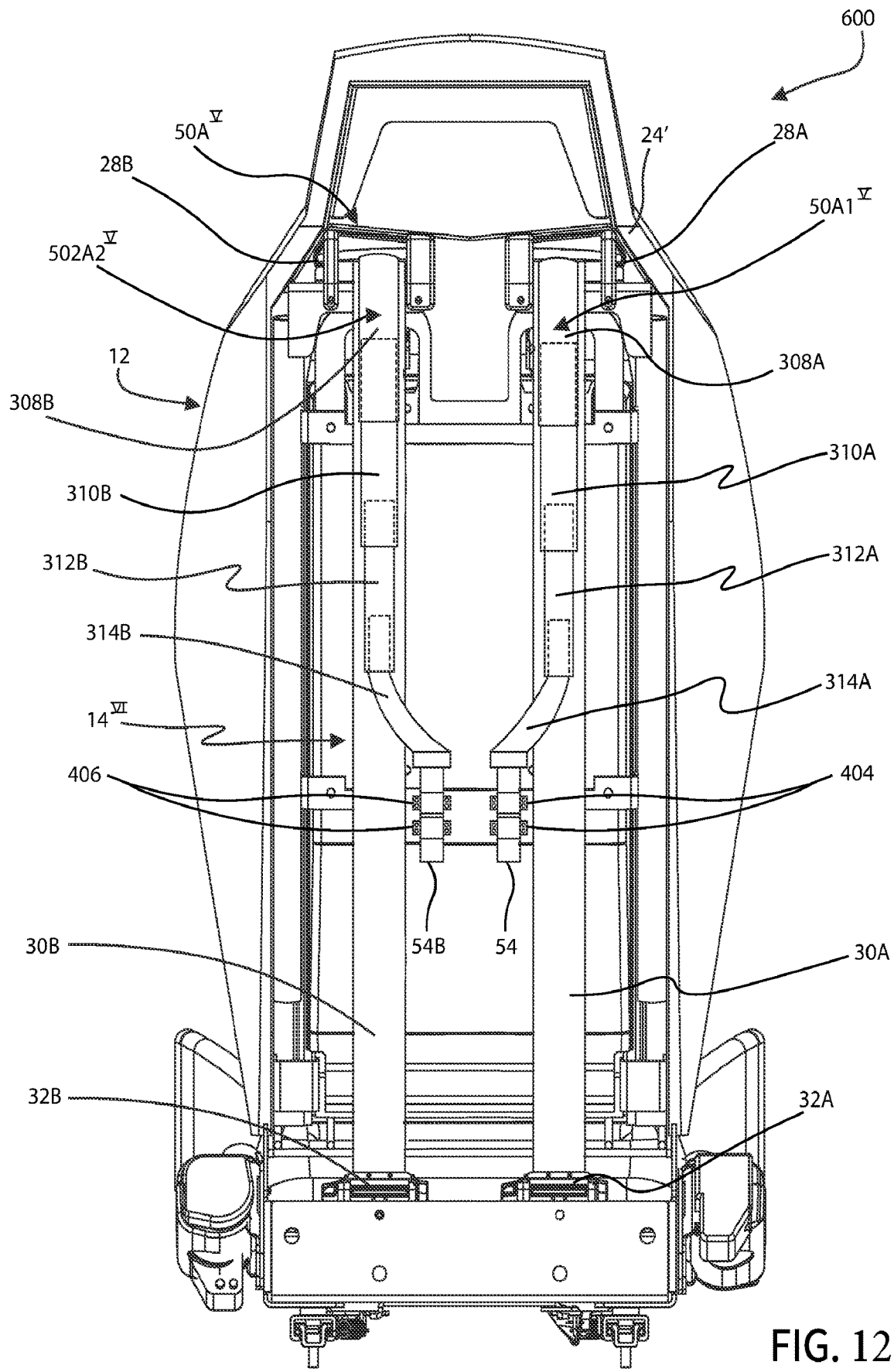
FIG. 12 is a rear elevational view of still another embodiment of the occupant restraint system.

Referring now to FIG. 12, still another alternate embodiment is shown of a combination 600 of an occupant seat 12 and occupant restraint system $14^{VI}$ for a motor vehicle, wherein the occupant restraint system $14^{VI}$ is provided in the form of a combination inflatable and web-based restraint. In this alternate embodiment, the occupant seat 12 is identical to the occupant seat 12 illustrated in FIGS. 1-7. The occupant restraint system $14^{VI}$ illustratively differs from the occupant restraint system $14^V$ illustrated in FIG. 11B and described above in that the bifurcated filler tube sections $50A1^{IV}$ and $50A2^{IV}$ are replaced with separate filler tubes $50A1^V$, $50A2^V$ each riding on a respective shoulder web 30A, 30B, and in that the web guide 24' is modified to omit the central passageway 28C. The filler tube $50A1^V$ illustratively rides on top of the shoulder web 30A and extends, along with the shoulder web 30A, through the opening 28A defined through the web guide 24' and into fluid communication at one with the airbag 50, and the filler tube $50A2^V$ illustratively rides on top of the shoulder web 30B and extends, along with the shoulder web 30B, through the opening 28B defined through the web guide 24' and into fluid communication at one end with the airbag 50. Each filler tube $50A1^V$, $50A2^V$ also extends along the respective shoulder web 30A, 30B along the seat back 20D and into fluid communication at a respective opposite end with a respective one of two separate inflators 54A, 54B, such that the airbag 50 is inflated via two separate inflators 54A, 54B each through a separate one of the filler tubes $50A1^V$, $50A2^V$. In this alternate embodiment, the filler tubes $50A1^V$, $50A2^V$ each illustratively include two or more telescoping filler tube sections which deploy and retract as the shoulder webs 30A, 30B are respectively paid out of and taken up into the web retractors 32A, 32B as described above with respect to FIG. 10. Such telescoping of the filler tubes $50A1^V$ and $50A2^V$ illustratively allows the inflators 54A, 54B to be secured, e.g., via straps or brackets 404, 406 respectively to the frame component 304 of the seat back 20. In the illustrated embodiment, each filler tube $50A1^V$, $50A2^V$ includes four fluidly-coupled telescoping sections 308A and 308B, 310A and 310B, 312A and 312B and 314A, 314B respectively, with the sections 308A and 308B each fluidly coupled to the airbag 50, and with the sections 314A and 314B each fluidly coupled to a fluid outlet of a respective one of the inflators 54A, 54B. It will be understood that in alternate embodiments, the filler tube $50A1^V$ and/or the filler tube $50A2^V$ may include more or fewer such telescoping sections. Although not shown in FIG. 11B, it will be further understood that the inflators 54A, 54B will both be electrically connected to one or more wires for electrically activating the inflators 54A, 54B. In alternate embodiments, one or both of the filler tubes $50A1^V$, $50A2^V$ may be non-telescoping.

Figure 13:
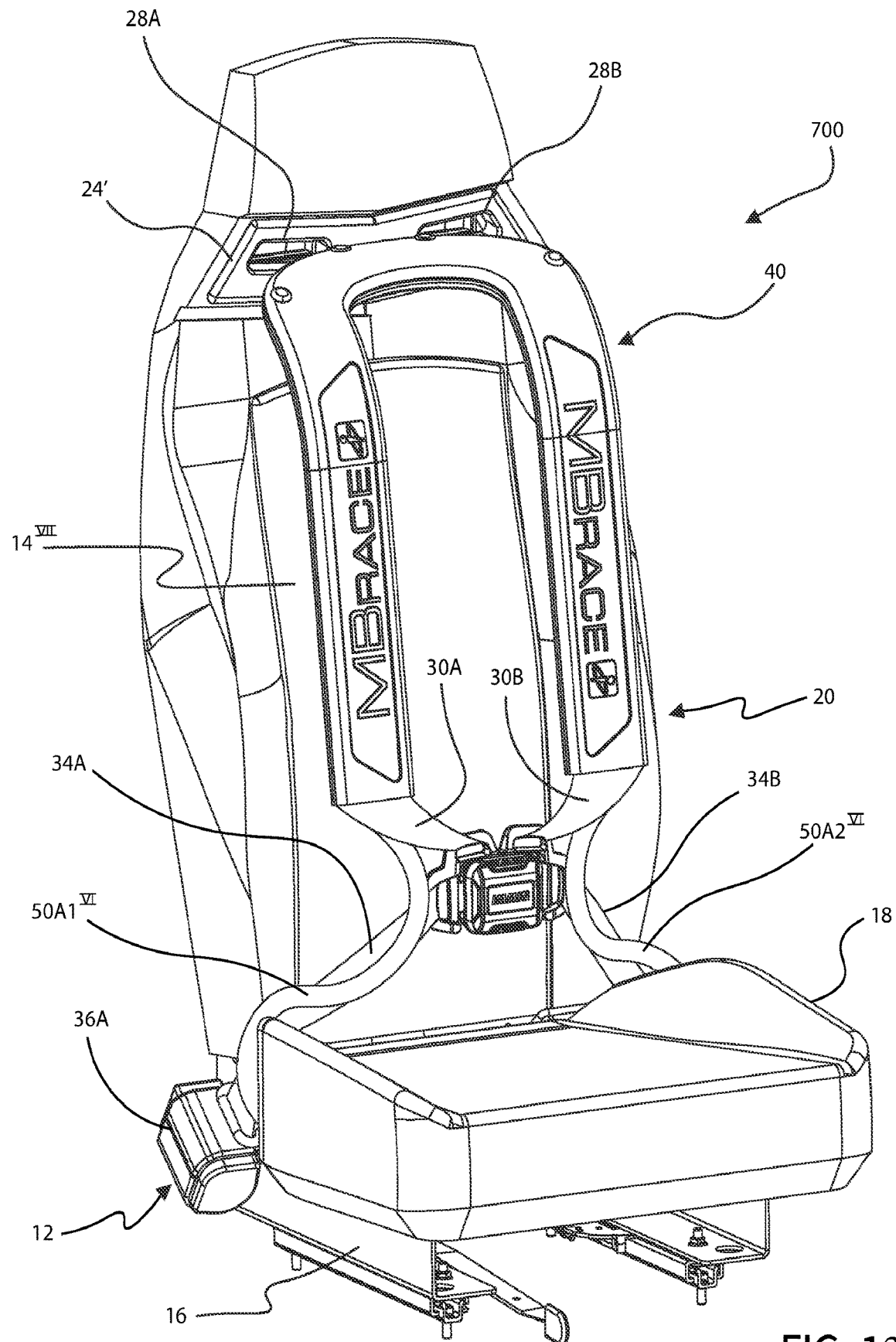
FIG. 13 is a front perspective view of still a further embodiment of the occupant restraint system.

Referring now to FIG. 13, another alternate embodiment is shown of a combination 700 of an occupant seat 12 and occupant restraint system $14^{VII}$ for a motor vehicle, wherein the occupant restraint system $14^{VII}$ is provided in the form of a combination inflatable and web-based restraint. In this alternate embodiment, the occupant seat 12 is identical to the occupant seat 12 illustrated in FIGS. 1-7. The occupant restraint system $14^{VII}$ illustratively differs from the occupant restraint system 14 illustrated in FIGS. 1-7 and described above in that the filler tube 50A is replaced with filler tubes $50A1^{VI}$ and $50A2^{VI}$ each riding on and along a respective lap web 34A, 34B along a front of the seat 12, the inflator(s)

is/are located on an underside of the seat bottom 18 or secured to the seat base 16, and the web guide 24' is modified to omit the central passageway 28C. The filler tube $50A1^{VI}$ illustratively rides on top of or along the lap web 34A and extends along the shoulder web 30A and into fluid communication at one with the portion of the airbag 50 housed within a lower portion of the respective leg of the collar 40, and the filler tube $50A2^{VI}$ illustratively rides on top of or along the lap web 34B and extends along the shoulder web 30B and into fluid communication at one end with the airbag 50 housed within a lower portion of the respective leg of the collar 40. Opposite ends of the filler tubes $50A1^{VI}$, $50A2^{VI}$ extend into fluid communication with a single inflator 54, or into fluid communication with a respective one of two separate inflators 54A, 54B, coupled to the seat base 16 and/or seat bottom 18. In the illustrated embodiment, the filler tubes $50A1^{VI}$, $50A2^{VI}$ are illustratively each formed of single tubes, although in alternate embodiments the filler tube $50A1^{VI}$ and/or the filler tube $50A2^{VI}$ may be telescoping as described above. In some alternate embodiments, the occupant restraint system $14^{VII}$ may include only one of the filler tubes $50A1^{VI}$ or $50A2^{VII}$ fluidly coupled to and between the airbag 50 and the one or more inflators.

Figure 14A:
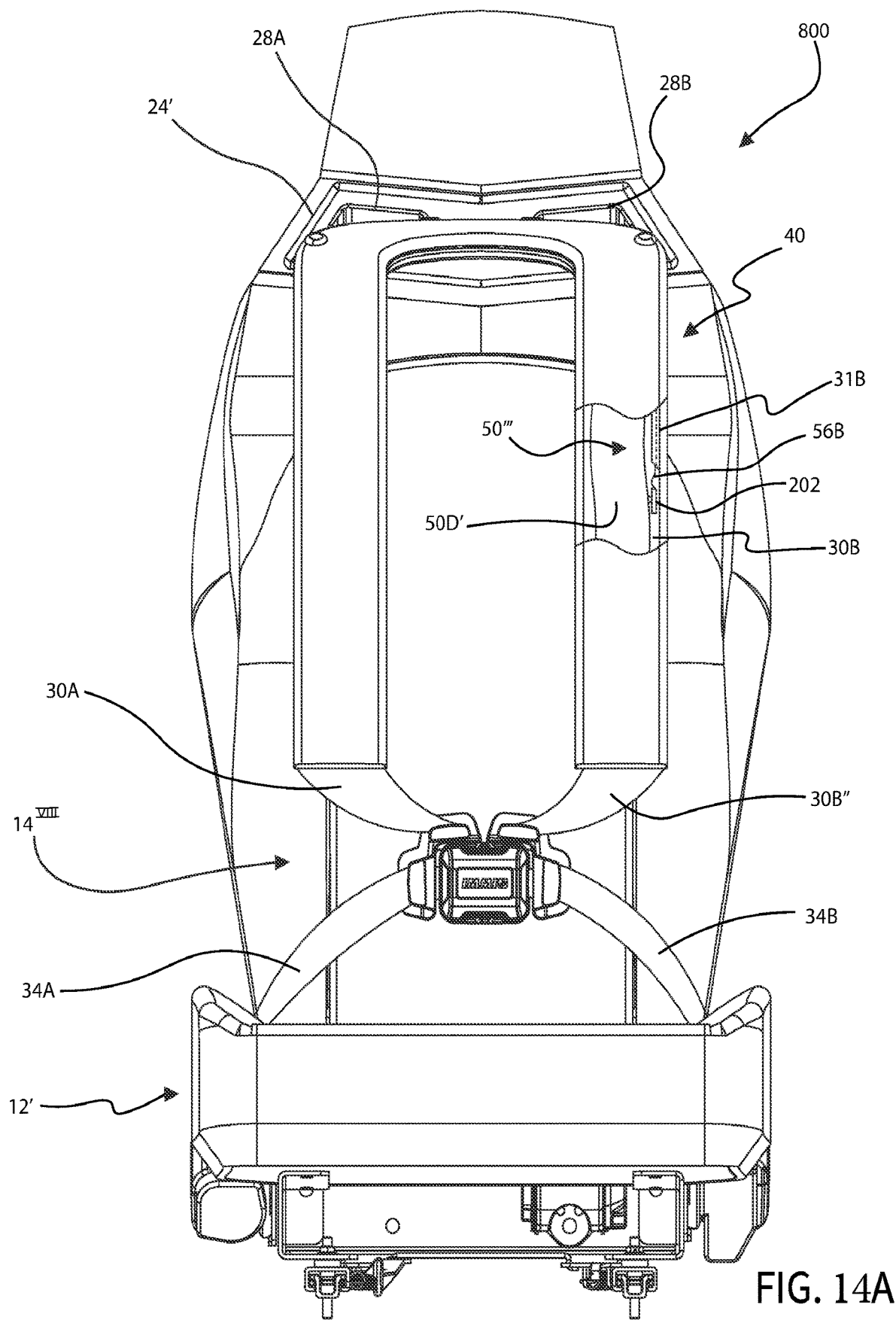
FIG. 14A is a front elevational view of yet another embodiment of the occupant restraint system.
Figure 14B:
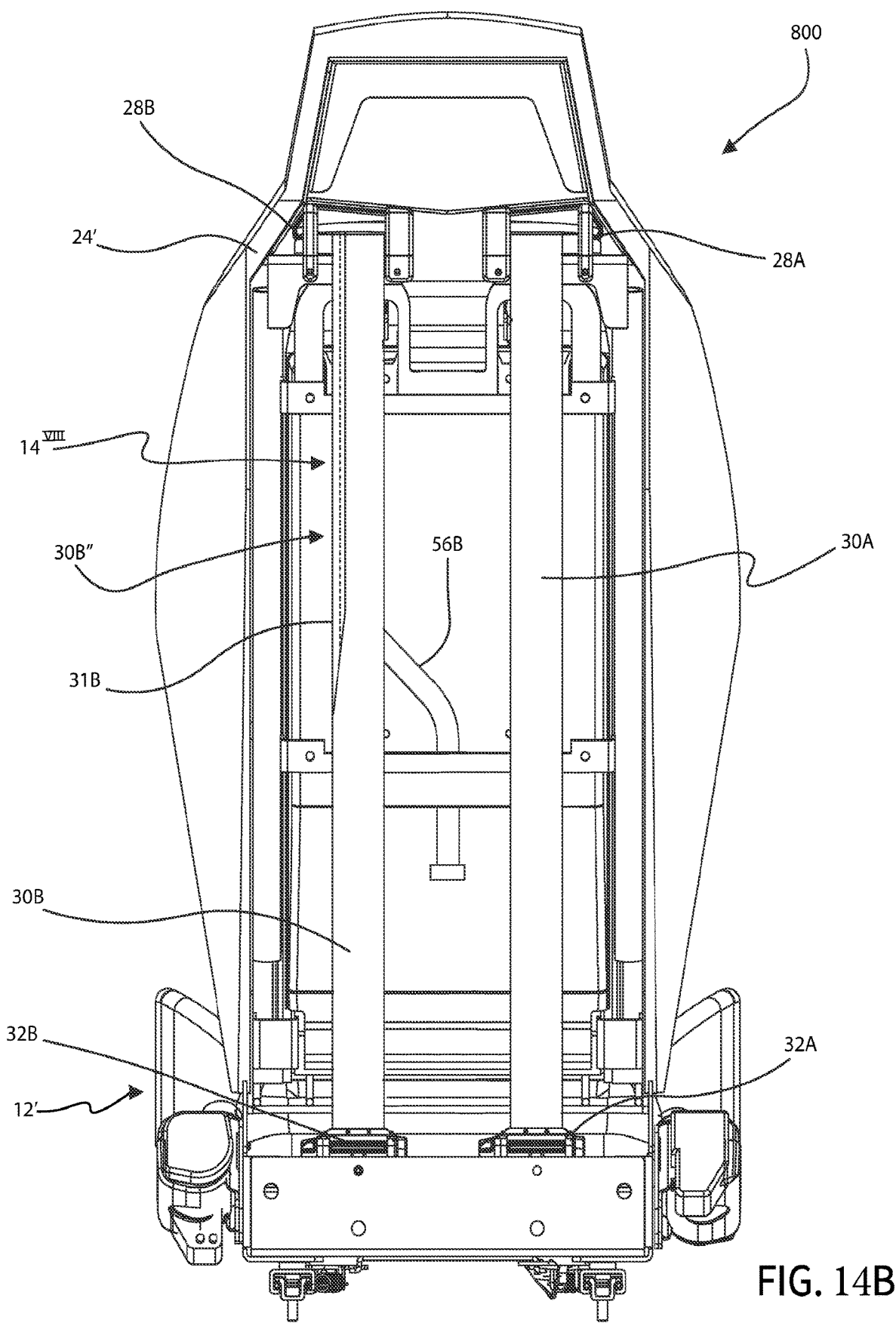
FIG. 14B is a rear elevational view of the embodiment of the occupant restraint system illustrated in FIG. 14A.

Referring now to FIGS. 14A and 14B, another alternate embodiment is shown of a combination 800 of an occupant seat 12 and occupant restraint system $14^{VIII}$ for a motor vehicle, wherein the occupant restraint system $14^{VIII}$ is provided in the form of a combination inflatable and web-based restraint similar to the occupant restraint system 14" illustrated in FIGS. 9A and 9B and described above. In this alternate embodiment, the occupant seat 12' is identical to the occupant seat 12' illustrated in FIGS. 9A-9B, and the occupant restraint system $14^{VIII}$ includes only a single inflator 202 coupled to one leg portion 50D' of the airbag 50''' within the one respective leg of the collar 40. The opposite leg of the collar 40, in this alternate embodiment, does not include an inflator coupled to the airbag 50'''. The inflator 202 is electrically connected to wiring 56B (e.g., one or more wires) routed to the back of the seat back along the shoulder web 30B'' as described above with respect to FIGS. 9A and 9B.

Figure 15:
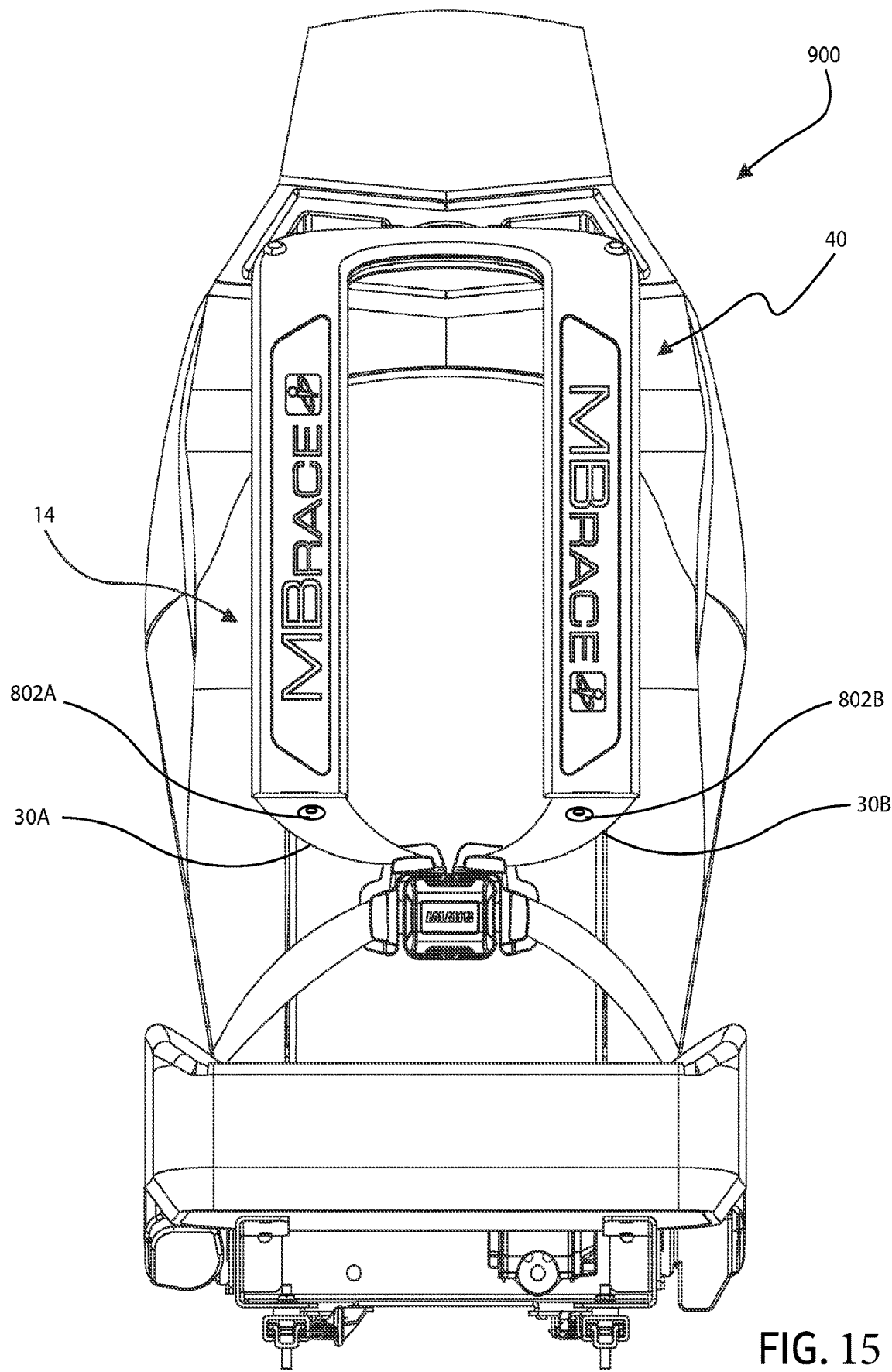
FIG. 15 is a front elevational view a further embodiment of the occupant restraint system.

Referring now to FIG. 15, another alternate embodiment is shown of a combination 900 of an occupant seat 12 and occupant restraint system 14 for a motor vehicle, wherein the occupant restraint system 14 may be implemented in any of the forms illustrated in the attached figures and described herein which include the occupant restraint collar 40. The embodiment illustrated in FIG. 15 differs from any such occupant restraint systems only in that buttons 802A, 802B are illustratively attached to, e.g., sewn onto, the respective shoulder webs 30A, 30B below each respective leg of the collar 40. The buttons 802A, 802B illustratively act as stops to the respective legs of the collar 40 to prevent the collar 40 from being displaced too far downwardly relative to the seat 12. It will be understood that the buttons 802A, 802B, and their locations relative to the respective lower ends of the collar 40, are provided only by way of example, and that other conventional structures may alternatively be coupled to or between one or both of the shoulder webs 30A, 30B and the collar 40 to prevent displacement of the collar 40 below a selected position relative to the seat 12 bottom or relative to the web coupling buckle.

Figure 16:
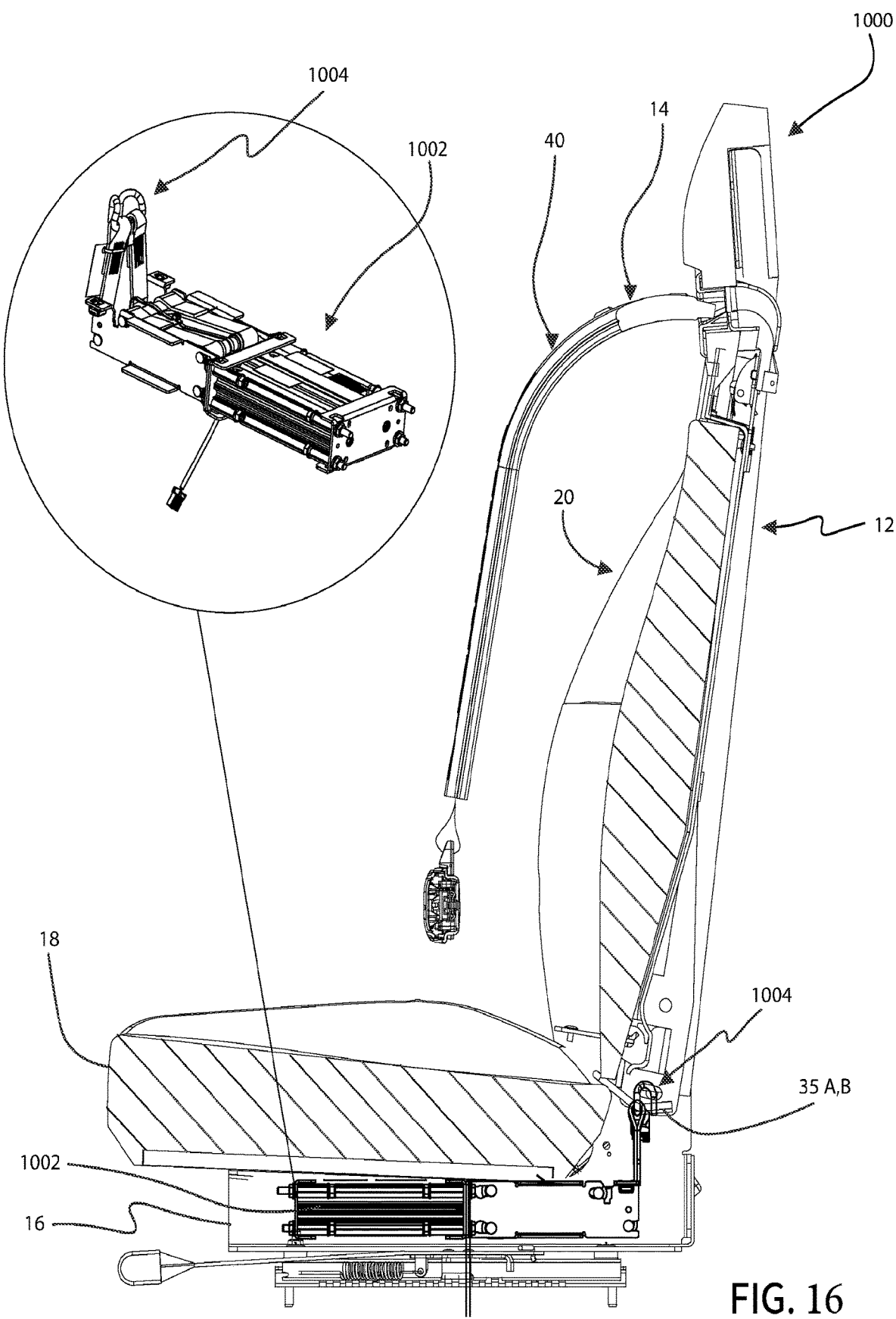
FIG. 16 is a cross-sectional view of the occupant restraint system of FIGS. 1-7, as viewed along section lines 16-16 of FIG. 1, illustrating an embodiment incorporating a restraint harness pretensioning system.

Referring now to FIG. 16, yet another alternate embodiment is shown of a combination 1000 of an occupant seat 12 and occupant restraint system 14 for a motor vehicle, wherein the occupant seat 12 and the occupant restraint system 14 may be implemented in any of the forms illustrated in the attached figures and described herein which include the occupant restraint collar 40 or any of its variants. The embodiment illustrated in FIG. 16 differs from other embodiments of the combination occupant seat 12 and occupant restraint system 14 illustrated in the attached figures and described herein by the inclusion of an occupant restraint pretensioning module 1002 mounted to the seat base 16 and/or seat bottom 18, and operatively coupled to the occupant restraint system 14. Operation of the pretensioning module 1002 is conventional in that it is configured to apply a specified or variable amount of tension to and on the restraint system 14 to tighten the lap webs 34A, 34B and shoulder harnesses 30A, 30B about the occupant of the seat 12. In embodiments in which the seat 12 is a suspension seat, the pretensioning module 1002 may further be configured to apply a specified or variable amount of tension to and on the restraint system 14 to, following pretensioning of the restraint system 14, pull the suspension seat downwardly toward, and in some embodiments into contact with the seat base 16 and/or floor of the motor vehicle.

In the illustrated embodiment, the pretensioning module 1002 includes at least one engagement member 1004, e.g., in the form of at least one hook, clip, bracket or the like, configured to be secure, via at least one web engagement member 35A, 35B, e.g., in the form of at least one hook, clip, bracket or the like, to at least one of the webs 30A, 30B, 34A, 34B and/or to at least one tongue or buckle of the restraint system 14. In one example embodiment, the engagement member(s) 1004 and the web engagement member(s) 35A, 35B may each include a single web engagement member configured to be secured to one another and with the web engagement member 35A operatively coupled to, i.e., secured to, one of the lap webs 34A, 34B or to one of the shoulder webs 30A, 30B or to one tongue or buckle of the restraint system 14. In other embodiments, the engagement member(s) 1004 and the web engagement member(s) 35A, 35B may each include two web engagement members each configured to be secured to one another and with the web engagement members 35A, 35B each operatively coupled to, i.e., secured to, a respective one of the lap webs 34A, 34B, to a respective one of the shoulder webs 30A, 30B or to one of the shoulder webs 30A, 30B and one of the lap webs 34A, 34B or to two tongues or buckles of the restraint system 14.

In any case, the occupant restraint pretensioning module 1002 is illustratively configured to be electrically connected to at least one decision-making circuit, e.g., to the external control module 58 illustrated by example in FIG. 4, and programmed to selectively activate the pretensioning module 1002 to apply tension to one or more of the webs 30A, 30B, 34A, 34B, e.g., in response to (e.g., prior to or as part of) a vehicle impact event, e.g., a frontal, side or rear impact, a vehicle rollover event or other vehicle event, or in response to an occupant request, e.g., via occupant activation of a manual switch electrically coupled to the decision-making circuit.

Figure 17:
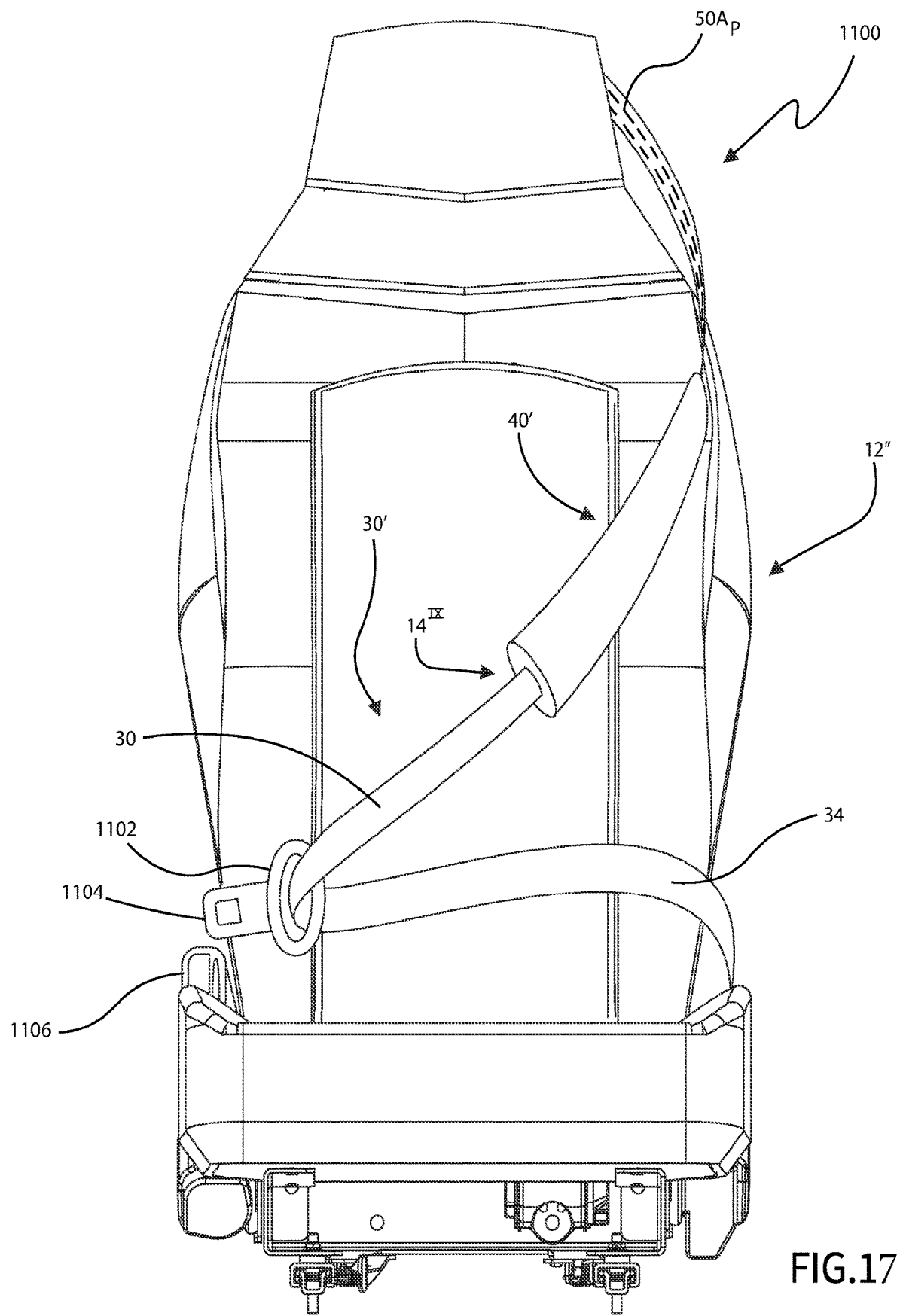
FIG. 17 is a front elevational view of another embodiment of the occupant restraint system implemented in a 3-point restraint configuration.

Referring now to FIG. 17, yet another alternate embodiment is shown of a combination 1100 of an occupant seat 12" and occupant restraint system $14^{IX}$ for a motor vehicle, wherein the occupant seat 12" differs from the occupant seats 12, 12' in that it does not include the web guide 24 and wherein the occupant restraint system $14^{IX}$ differs from the other embodiments illustrated in the attached figures and described therein in that the restraint harness (comprising a 4-point restraint) is implemented in the form of a conventional 3-point restraint harness with a single inflatable airbag housed within a sleeve 40' operatively coupled to the shoulder web portion. In the illustrated embodiment, the restraint harness includes a single web 30' having one end extending over and about the upper portion of the seat back and coupled to a rear portion of the seat back, and having an opposite end attached to the seat bottom or seat base. The web 30' passes through a web guide 1102 which partitions the web 30' into a shoulder web 30 and a lap web 34, wherein the web guide 1102 is secured to a releasable engagement member 1104 configured to releasably engage another engagement member 1106 attached to the seat bottom and/or seat base. In the illustrated embodiment, the engagement member 1104 is a conventional tongue member and the engagement member 1106 is a conventional buckle member, with each configured to releasably engage one another in a conventional manner, although in alternate embodiments the engagement member 1104 may be a buckle member and the engagement member 1106 may be a tongue member. In the illustrated embodiment, the fill tube $50A_P$ runs along the back side of the shoulder portion 30 of the web 30', and fluidly couples at one end to the airbag 50 carried within the sleeve 40' and fluidly couples at an opposite end to an inflator secured to the rear of the seat back as described above. In some embodiments, the fill tube $50A_P$ may be a single length of tubing, although in alternate embodiments the fill tube $50A_P$ may include two or more telescoping segments as described above. In other alternate embodiments, the portion of the shoulder web 30 extending between the top of the sleeve 40' and the inflator may be provided in the form of a web tube as illustrated by example in FIGS. 8A and 8B and described above, wherein the filler tube $50A_P$ extends through a channel defined through the shoulder web 30 and into engagement with the inflator and with the airbag carried by and within the sleeve 40'.

Figure 18A:
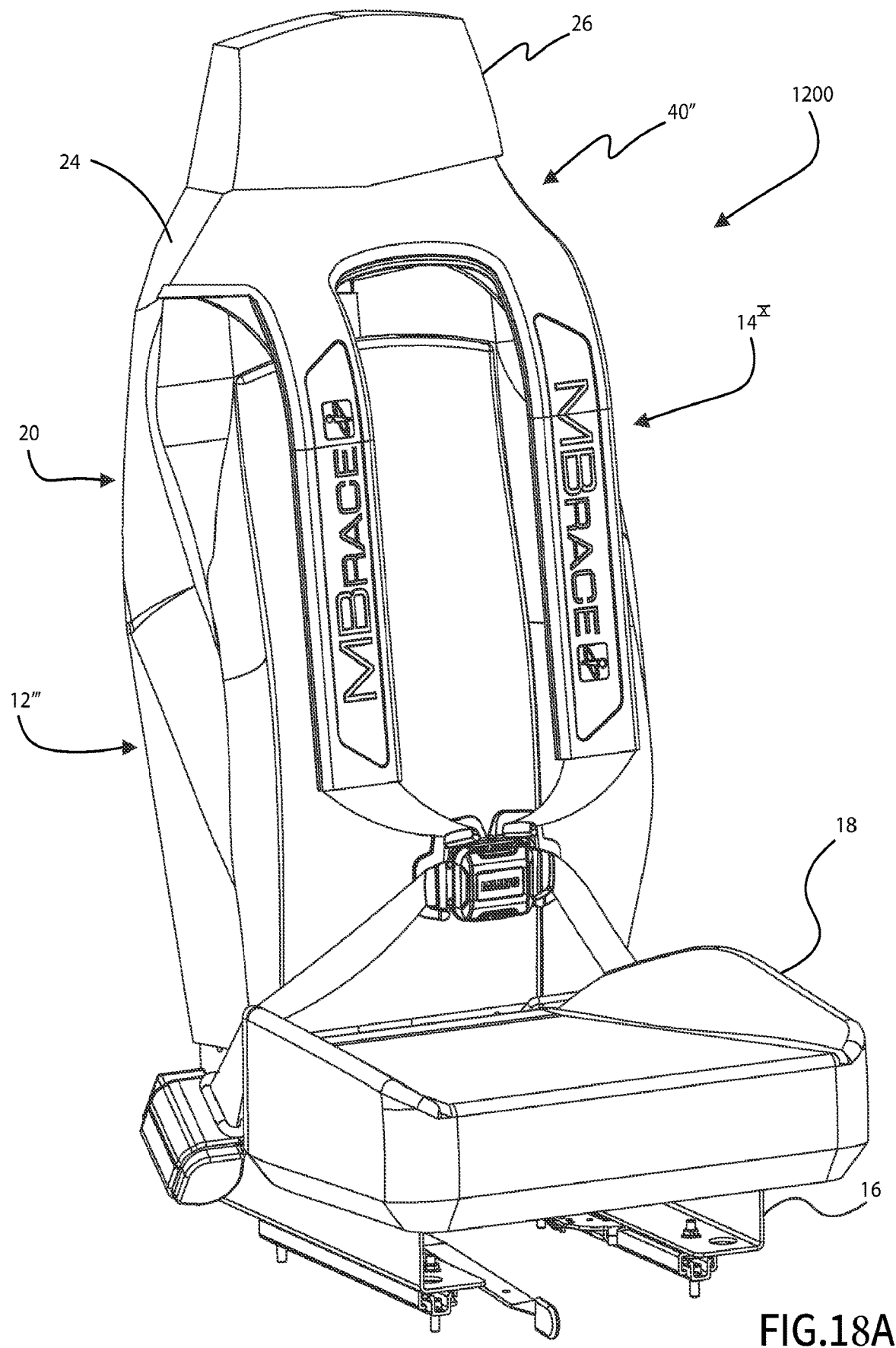
FIG. 18A is a front perspective view of still a further embodiment of the occupant restraint system.
Figure 18B:
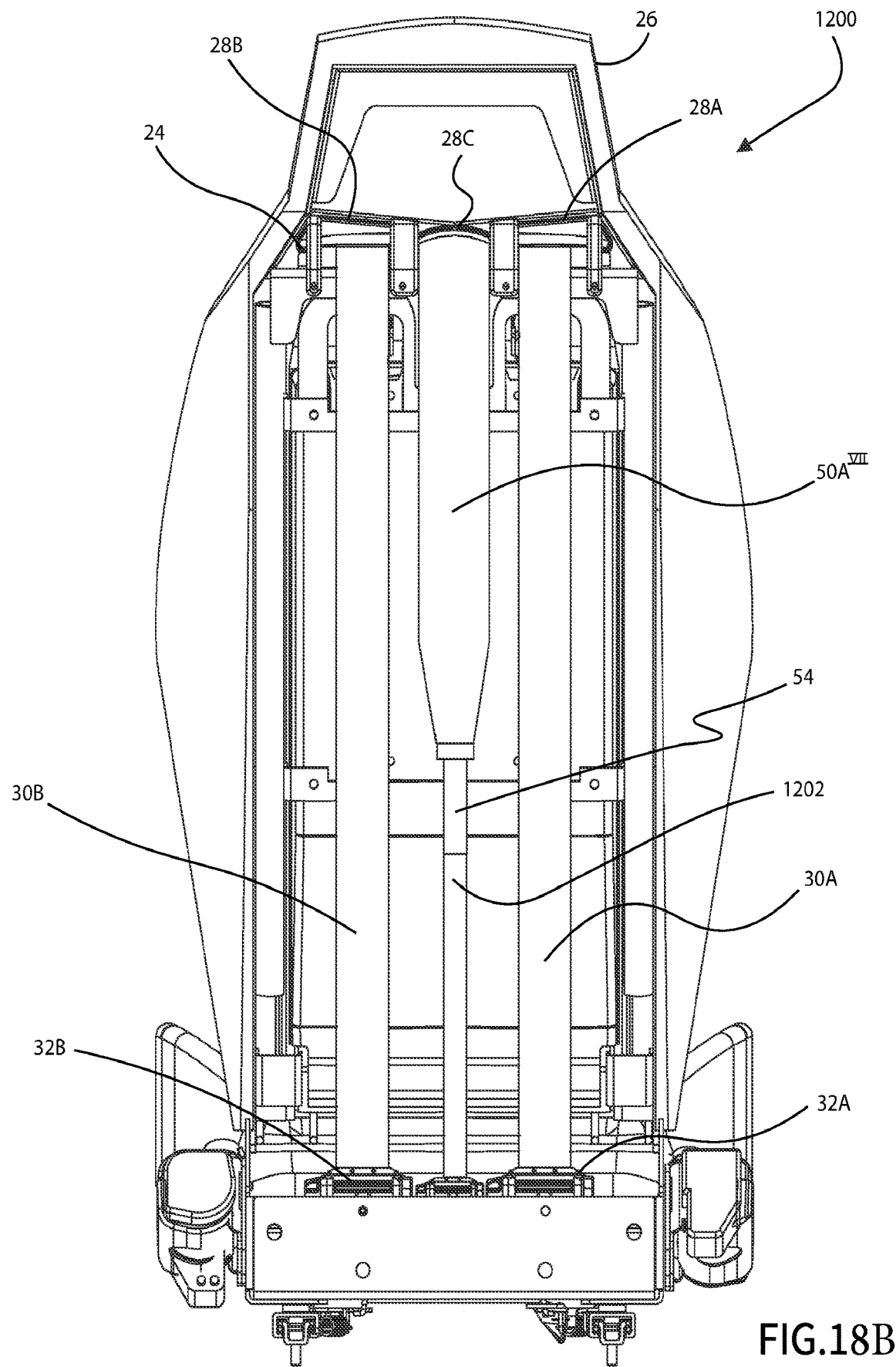
FIG. 18B is a rear elevational view of the occupant restraint system of FIG. 18A.

Referring now to FIGS. 18A and 18B, still another alternate embodiment is shown of a combination 1200 of an occupant seat 12" and occupant restraint system $14^X$ for a motor vehicle, wherein the occupant restraint system $14^X$ is provided in the form of a combination inflatable and web-based restraint. In this alternate embodiment, the occupant seat 12" and the occupant restraint system $14^X$ are both similar to the respective occupant seat 12 and occupant restraint system 14 illustrated in FIGS. 1-7 but each differs in that the collar 40" of the occupant restraint system $14^X$ is secured to, or integral with, the seat back 20 of the occupant seat 12". In the illustrated embodiment, the U-shaped portion of the collar 40" is secured to or integral with the web guide 24 such that the collar 40" is not movable relative to the seat 12" or relative to the shoulder webs 30A, 30B of the restraint system $14^X$ which pass through the collar 40" as described above with respect to the collar 40. The webs 30A, 30B, 34A, 34B are otherwise as described hereinabove. The collar 40", and the airbag 50 carried thereby, are otherwise as described above with respect to the collar 40 and airbag 50.

Because the collar 40" is secured to the seat back 20 and is therefore not movable with or along the shoulder webs 30A, 30B, the filler tube $50^{VII}$ extending through the opening 28C of the web guide 24 into fluid communication with the airbag 50 is likewise not movable relative to the seat back 20 and is instead secured to the seat back 20, seat bottom 18 or seat base 16 via a tether 1202 or other mechanical attachment mechanism. In the illustrated embodiment, for example, the tether 1202 is coupled to one end of the inflator 54 having an opposite end fluidly coupled to the filler tube $54A^{VII}$. In alternate embodiments, the filler tube $50^{VII}$ may be secured directly to the seat back 20, seat bottom 18 or seat base 16 via a tether, strap, bracket or other conventional securement device(s).

Figure 19:
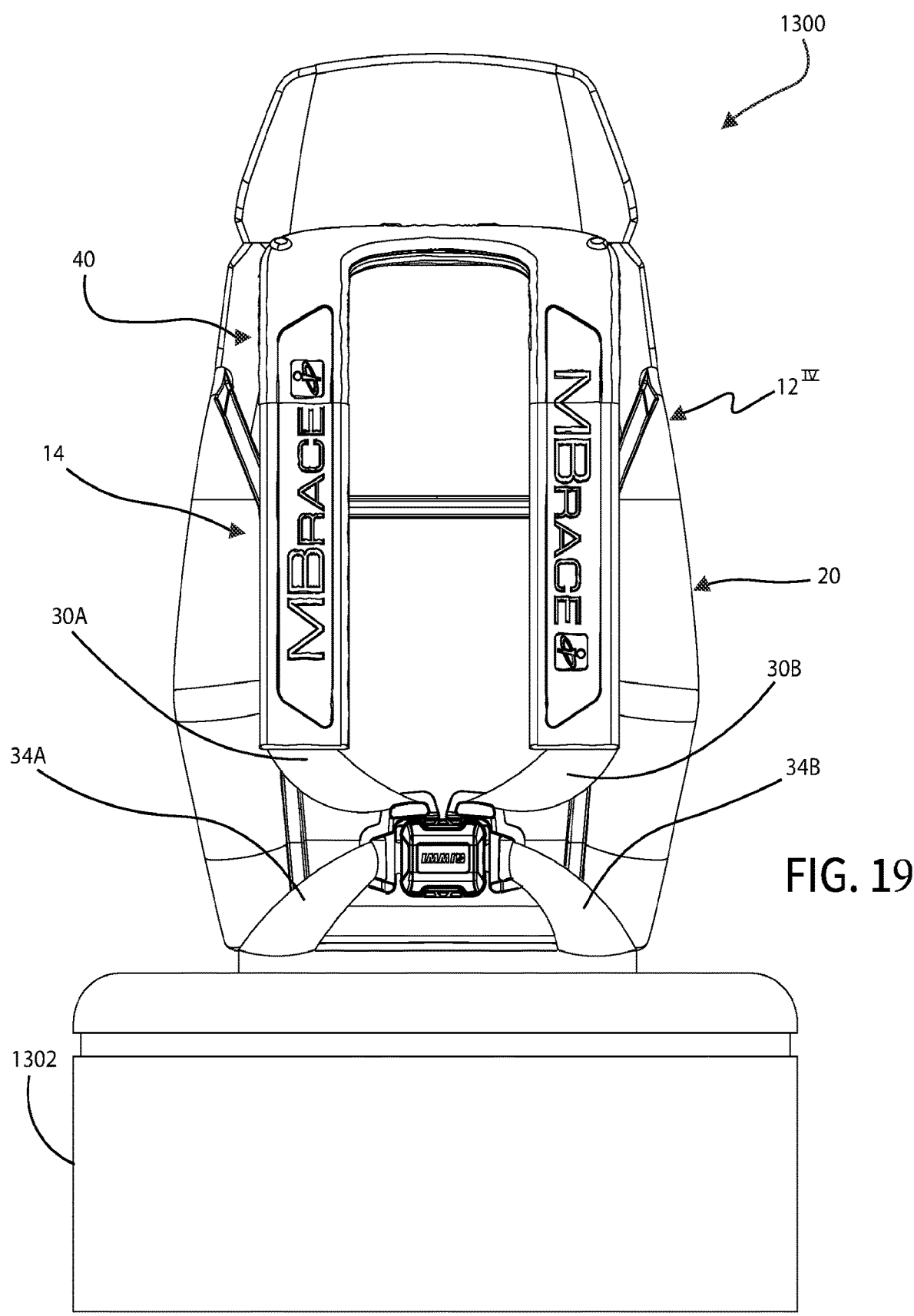
FIG. 19 is a front elevational view of another embodiment of the occupant restraint system integrated into a modular seat back.

Referring now to FIG. 19, a further alternate embodiment is shown of a combination 1300 of an occupant seat $12^{IV}$ and occupant restraint system 14 for a motor vehicle. Illustratively, the seat $12^{IV}$ is identical to the seat 12 illustrated in FIGS. 1-7 except that the seat bottom 18 and seat base are omitted, and the web retractors 32A, 32B, 36A and 36B are all mounted to the back surface 20D of the seat back 20. The restraint system 14 is otherwise identical in structure and operation to the restraint system 14 illustrated in FIGS. 1-7 and described above, although in alternate embodiments the restraint system 14 may be provided in the form of any of the variants of the restraint system 14 illustrated in the attached figures and described above.

The seat $12^{IV}$ and restraint system 14 together illustratively define a mobile or modular combination 1300 of an occupant seat $12^{IV}$ and occupant restraint system 14 which may be secured to a wall or other structure of a motor vehicle above, and usable with, an existing occupant seat or bench 1302. Although intended for used with patient-transporting emergency vehicles, e.g., ambulances and the like, it will be understood that the combination 1300 may be used in any motor vehicle which includes an occupant seating structure and a wall and/or other structure extending upwardly from the combination 1300 to which the combination 1300 can be mounted.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

What is claimed is:

1. A combination inflatable and web-based restraint for an occupant of a motor vehicle seat, the combination comprising:
   an occupant restraint collar having an arcuate portion, and first and second spaced apart legs each joined to or integral with the arcuate portion and extending downwardly from the arcuate portion to first and second respective free ends, the occupant restraint collar configured to engage the occupant with the arcuate portion extending about a back of a neck and over opposite shoulders of the occupant and with the first and second legs extending downwardly along respective sides of a torso of the occupant,
   a first shoulder web configured to extend through or over a seat back of the vehicle seat, the first shoulder web extending through the first leg adjacent to a front of the seat back,
   a second shoulder web configured to extend through or over the seat back, the second shoulder web extending through the second leg adjacent to the front of the seat back,
   an inflatable airbag housed, in an uninflated state, within the arcuate portion and the first and second legs of the occupant restraint collar, the airbag configured to open a seam of, and extend out of, the arcuate portion and the first and second legs of the occupant restraint collar upon deployment thereof, and
   at least one inflator fluidly coupled to the airbag for deploying the airbag,
   wherein, with the entire occupant restraint collar engaging the occupant, the entire occupant restraint collar is movable relative to the motor vehicle seat along each of the first and second shoulder webs.

2. The combination of claim 1, wherein the combination further comprises at least one filler tube configured to extend through, and move relative to, the seat back of the vehicle seat, the at least one filler tube having at least one end fluidly coupled to the airbag within the collar and at least one opposite end fluidly coupled to at least one gas outlet of the at least one inflator disposed along a back side of the seat back.

3. The combination of claim 2, further comprising an elongated guide tube configured to be mounted to the back side of the seat back with an opening facing a top of the seat back, the elongated guide tube configured to receive the at least one inflator and at least a portion of the filler tube therein via the opening such that the at least one inflator and the at least a portion of the guide tube are movable within and relative to the guide tube with movement of the at least one filler tube relative to the seat back.

4. The combination of claim 2, wherein the at least one inflator comprises a first inflator and a second inflator each having a gas outlet fluidly coupled to the at least one opposite end of the at least one filler tube.

5. The combination of claim 2, wherein the at least one filler tube comprises at least two filler tube segments configured for telescoping movement relative to one another.

6. The combination of claim 2, wherein at least a portion of the first shoulder web between the collar and the at least one inflator comprises a first web tube and at least a portion of the second shoulder web between the collar and the at least one inflator comprises a second web tube, and wherein the at least one filler tube comprises:
 a first filler tube disposed within the first web tube and configured to extend with the first web tube through or over the seat back, and
 a second filler tube disposed within the second web tube and configured to extend with the second web tube through or over the seat back,
 wherein the first and second filler tubes are each fluidly coupled to and between the airbag and the at least one inflator.

7. The combination of claim 2 wherein the at least one filler tube comprises:
 a first filler tube configured to ride on and extend with the first web through or over the seat back, and
 a second filler tube configured to ride on and extend with the second web through or over the seat back,
 wherein the first and second filler tubes are each fluidly coupled to and between the airbag and the at least one inflator.

8. The combination of claim 6, wherein the at least one inflator comprises a first inflator having a gas outlet fluidly coupled to the first filler tube and a second inflator having a gas outlet fluidly coupled to the second filler tube.

9. The combination of claim 6, wherein the first filler tube comprises at least first and second filler tube segments configured for telescoping movement relative to one another,
 and wherein the second filler tube comprises at least third and fourth filter tube segments configured for telescoping movement relative to one another.

10. The combination of claim 1, wherein the at least one inflator is configured to be mounted to a seat bottom or a seat base of the motor vehicle seat,
 and wherein the combination further comprises at least one filler tube configured to extend along at least one lap web and to be fluidly coupled to and between the airbag and at least one gas outlet of the at least one inflator.

11. The combination of claim 10, wherein the at least one filler tube comprises at least two filler tube segments configured for telescoping movement relative to one another.

12. The combination of claim 1, wherein the at least one inflator comprises at least one inflator disposed within the collar and fluidly coupled to the airbag within the collar,
 and wherein the combination further comprises:
 wiring operatively coupled to the at least one inflator and extending along at least one of the first and second shoulder webs and extending with the at least one of the first and second shoulder webs over or through the seat back, and
 at least one channel member affixed to and between front and back surfaces of, and extending along, the at least one of the first and second shoulder webs to define at least one channel therebetween, wherein the wiring extends through the at least one channel.

13. The combination of claim 1, further comprising means for preventing displacement of the collar below a selected position relative to a seat bottom of the motor vehicle seat.

14. An occupant seat for a motor vehicle, the occupant seat comprising
 a seat bottom configured to be mounted to the motor vehicle,
 a seat back extending upwardly away from the seat bottom to define an occupant support area between the seat bottom and a front side of the seat back, and
 the combination inflatable and web-based restraint of claim 1, wherein the first and second shoulder webs are part of a restraint harness configured to restrain an occupant seated in the occupant support area, the first and second shoulder webs each extending from the occupant support area through or over the seat back.

15. The occupant seat of claim 14, wherein the at least one inflator is disposed along a back side of the seat back opposite the occupant support area,
 and further comprising at least one filler tube extending through, and movable relative to, the seat back of the vehicle seat, the at least one filler tube having at least one end fluidly coupled to the airbag within the collar and at least an opposite end fluidly coupled to at least one gas outlet of the at least one inflator.

16. The occupant seat of claim 15, further comprising an elongated guide tube mounted to the back side of the seat back with an opening facing a top of the seat back, the elongated guide tube receiving the at least one inflator and at least a portion of the filler tube therein via the opening such that the at least one inflator and the at least a portion of the guide tube are movable within and relative to the guide tube with movement of the at least one filler tube relative to the seat back.

17. A combination inflatable and web-based restraint for an occupant of a motor vehicle seat, the combination comprising:
 a U-shaped occupant restraint collar configured to extend about a back of a neck, and over opposite shoulders, and downwardly along opposite sides of a torso of, the occupant,
 a first shoulder web configured to extend through or over a seat back of the vehicle seat, the first shoulder web extending through the collar adjacent to a front of the seat back,
 a second shoulder web configured to extend through or over the seat back, the second shoulder web extending through the collar adjacent to the front of the seat back such the collar is movable relative to the motor vehicle seat along each of the first and second shoulder webs, an inflatable airbag housed, in an uninflated state, within the collar, the airbag configured to open a seam of, and extend out of, the collar about a periphery of the collar upon deployment thereof, the inflatable air bag including at least one filler tube configured to extend through the seat back of the vehicle seat, the at least one filler tube having at least one end fluidly coupled to the airbag within the collar such that the at least one filler tube moves with the collar relative to the motor vehicle seat, and at least an opposite end configured to be disposed along a back side of the seat back, and at least one inflator having at least one gas outlet fluidly coupled to the at least an opposite end of the at least one filler tube, the at least one inflator configured to inflate and deploy the airbag.

18. The combination of claim 17, further comprising an elongated guide tube configured to be mounted to the back side of the seat back with an opening facing a top of the seat back, the elongated guide tube configured to receive the at least one inflator and at least a portion of the filler tube therein via the opening such that the at least one inflator and the at least a portion of the guide tube are movable within and relative to the guide tube with movement of the at least one filler tube relative to the seat back.

19. An occupant seat for a motor vehicle, the occupant seat comprising:
a seat bottom configured to be mounted to the motor vehicle,
a seat back extending upwardly away from the seat bottom to define an occupant support area between the seat bottom and a front side of the seat back,
a restraint harness configured to restrain an occupant seated in the occupant support area, the restraint harness including first and second shoulder webs each extending from the occupant support area through or over the seat back,
a U-shaped occupant restraint collar configured to extend about a back of a neck, over opposite shoulders, and downwardly along opposite sides of a torso of, the occupant, the collar movably coupled to the first and second shoulder webs, and the collar movable relative to the occupant seat along the first and second shoulder webs,
an inflatable airbag housed, in an uninflated state, within the collar, the airbag configured to open a seam of, and extend out of, the collar about a periphery of the collar upon deployment thereof, the inflatable airbag including at least one filler tube extending through the seat back of the vehicle seat, the at least one filler tube having at least one end fluidly coupled to the airbag within the collar such that the at least one filler tube moves with the collar along the first and second webs and relative to the motor vehicle seat, and at least an opposite end disposed along a back side of the seat back opposite the occupant support area, and
at least one inflator having at least one gas outlet fluidly coupled to the at least an opposite end of the at least one filler tube, the at least one inflator configured to inflate and deploy the airbag.

20. The occupant seat of claim 19, further comprising an elongated guide tube mounted to the back side of the seat back with an opening facing a top of the seat back, the elongated guide tube receiving therein the at least one inflator and at least a portion of the filler tube via the opening such that the at least one inflator and the at least a portion of the guide tube are movable within and relative to the guide tube with movement of the at least one filler tube relative to the seat back.

* * * * *